US012169585B2

(12) United States Patent
Yoshizawa et al.

(10) Patent No.: US 12,169,585 B2
(45) Date of Patent: *Dec. 17, 2024

(54) MOBILE INFORMATION TERMINAL AND CONTROL METHOD THEREOF

(71) Applicant: MAXELL, LTD., Kyoto (JP)

(72) Inventors: Kazuhiko Yoshizawa, Oyamazaki (JP); Yasunobu Hashimoto, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,527

(22) Filed: Feb. 3, 2023

(65) Prior Publication Data

US 2023/0177215 A1 Jun. 8, 2023

Related U.S. Application Data

(63) Continuation of application No. 16/761,775, filed as application No. PCT/JP2018/006839 on Feb. 26, 2018, now Pat. No. 11,593,524.

(51) Int. Cl.
*G06F 21/62* (2013.01)
*G06F 21/00* (2013.01)
*G06F 21/44* (2013.01)
*G06F 21/45* (2013.01)
*G06F 21/60* (2013.01)

(52) U.S. Cl.
CPC ............ *G06F 21/629* (2013.01); *G06F 21/44* (2013.01); *G06F 21/45* (2013.01); *G06F 21/604* (2013.01)

(58) Field of Classification Search
CPC ........ G06F 21/629; G06F 21/44; G06F 21/45; G06F 21/604; G06F 21/30; G06F 21/31; G06F 21/62
See application file for complete search history.

(56) References Cited

U.S. PATENT DOCUMENTS

2006/0242713 A1   10/2006   Ruzyski et al.
2007/0247435 A1*  10/2007   Benko .................. G06F 3/0488
                                              345/173
2013/0227675 A1    8/2013   Fujioka
(Continued)

FOREIGN PATENT DOCUMENTS

JP    H01-228051 A1    9/1989
JP    2005244675 A     9/2005
(Continued)

OTHER PUBLICATIONS

Notice of Allowance issued in U.S. Appl. No. 16/761,775, dated Nov. 4, 2022.
(Continued)

*Primary Examiner* — Edward Zee
(74) *Attorney, Agent, or Firm* — Rimon P.C.

(57) ABSTRACT

An operation for restricting an operation for an application of a mobile information terminal by a user other than an authorized user of the mobile information terminal is received. Whether or not the user is the authorized user of the mobile information terminal is authenticated. When the user is authenticated to be the authorized user, the operation for the application of the mobile information terminal is allowed. When the user is not authenticated to be the authorized user, the operation for the application of the mobile information terminal is restricted.

14 Claims, 13 Drawing Sheets

(56) References Cited

U.S. PATENT DOCUMENTS

| | | | |
|---|---|---|---|
| 2014/0273964 A1* | 9/2014 | Noh | H04W 12/08 |
| | | | 455/411 |
| 2014/0283012 A1* | 9/2014 | Eggerton | G06F 21/31 |
| | | | 726/19 |
| 2014/0283128 A1 | 9/2014 | Shepherd et al. | |
| 2015/0067320 A1 | 3/2015 | Chatterton et al. | |

FOREIGN PATENT DOCUMENTS

| | | |
|---|---|---|
| JP | 2008-538839 A | 11/2008 |
| JP | 2009-282862 A | 12/2009 |
| JP | 2011-013855 A | 1/2011 |
| JP | 2014-143575 A | 8/2014 |
| JP | 2015-528674 A | 9/2015 |
| JP | 2016-504638 A | 2/2016 |
| WO | 2002/23359 A1 | 3/2002 |
| WO | 2014/035454 A1 | 3/2014 |

OTHER PUBLICATIONS

Final Office Action issued in U.S. Appl. No. 16/761,775, dated Mar. 23, 2022.

Non-Final Office Action issued in U.S. Appl. No. 16/761,775, dated Aug. 3, 2021.

Notice of Reasons for Refusal issued for the corresponding Japanese patent application No. 2020-501972 dated Nov. 30, 2021, with English translation.

International Search Report Issued in corresponding International Patent Application No. PCT/JP2018/006839, dated May 22, 2018, with English translation.

Notice of Reasons for Refusal issued for corresponding JP patent application No. 2022-187669 dated Jan. 23, 2024 w/English Translation.

* cited by examiner

F I G. 1 B
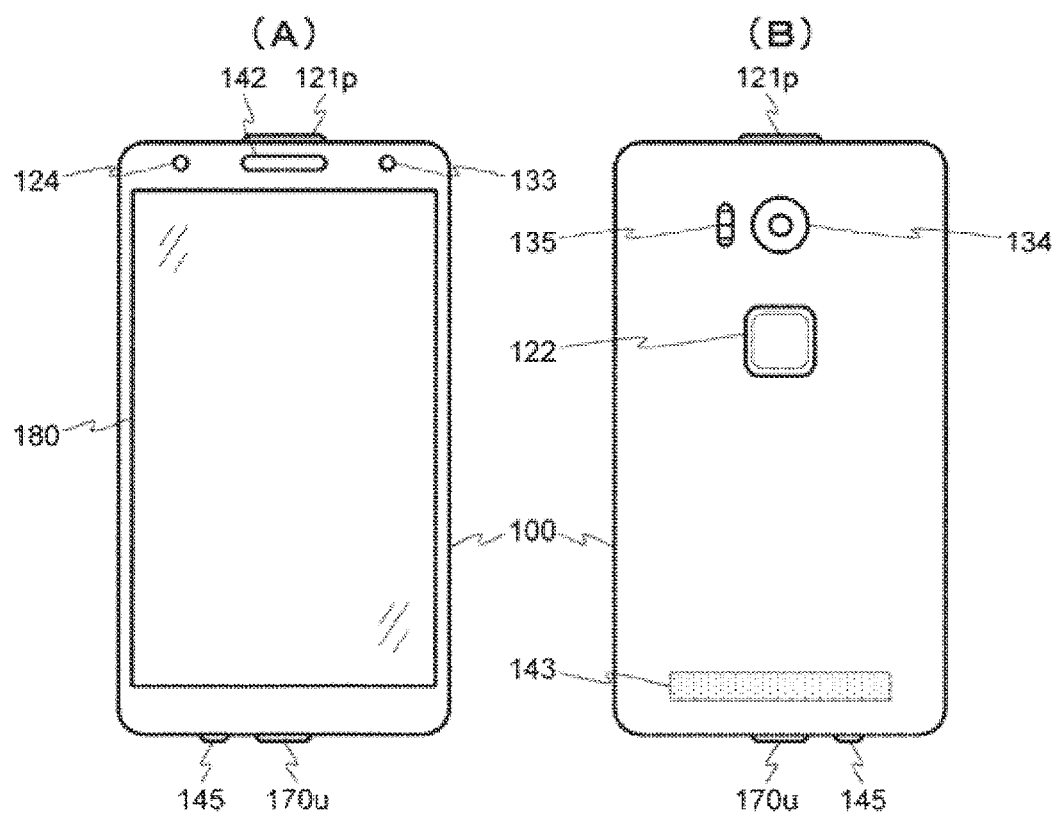

F I G. 1C
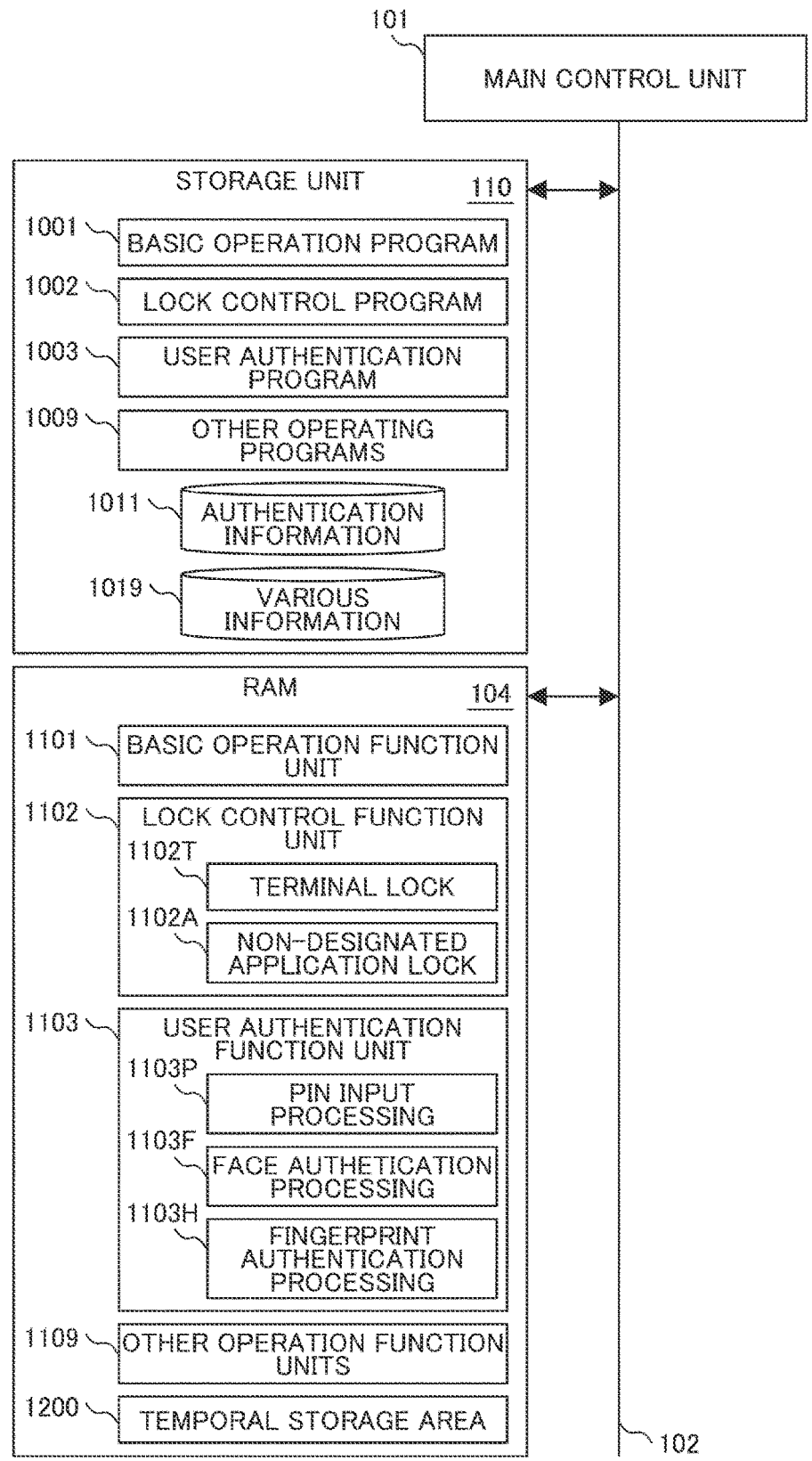

F I G. 2 C
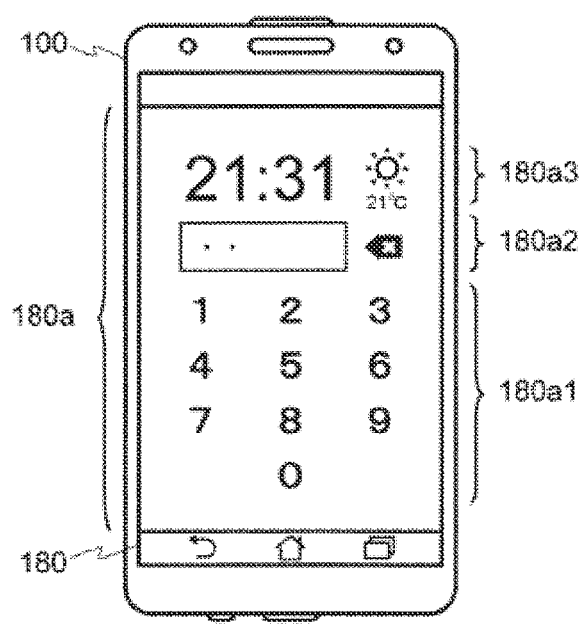
F I G. 2 D
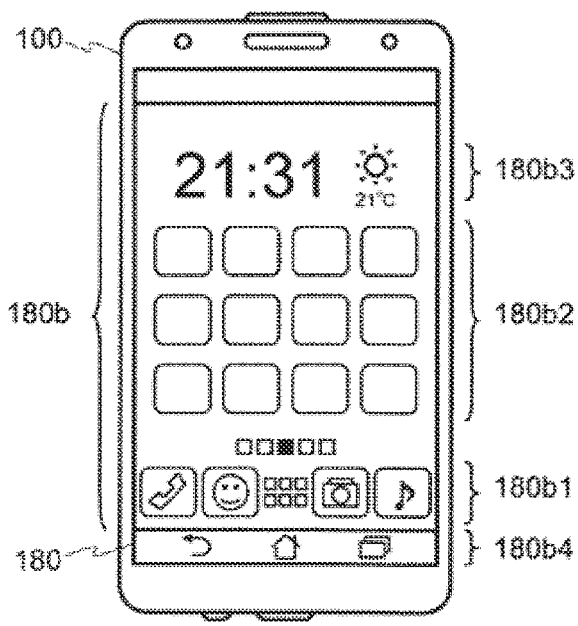

F I G. 4
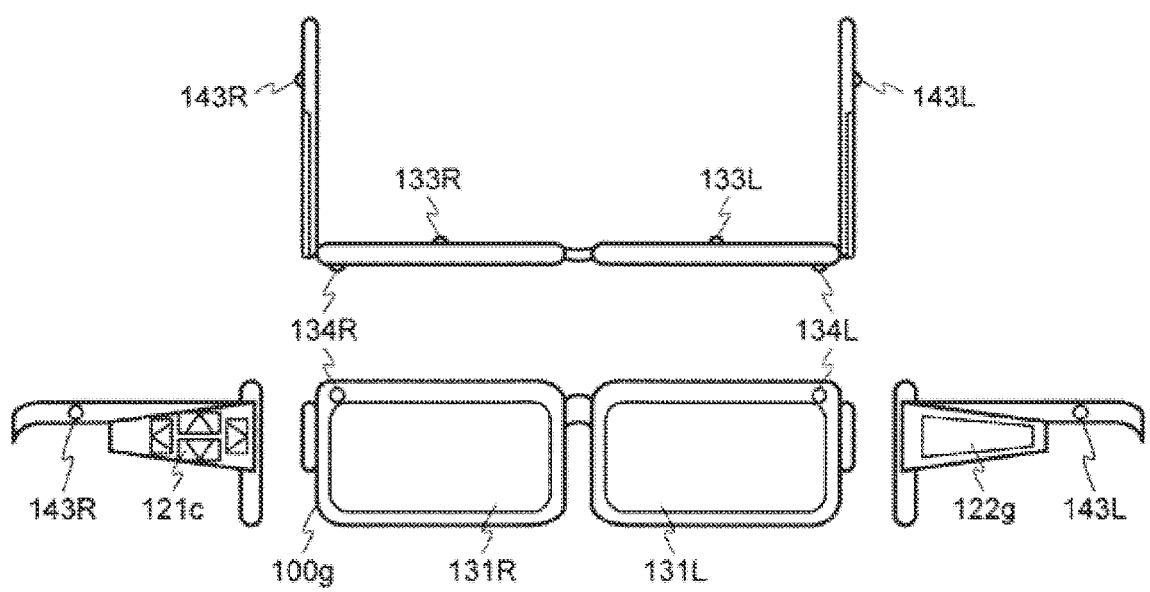

MOBILE INFORMATION TERMINAL AND CONTROL METHOD THEREOF

CROSS-REFERENCE TO RELATED APPLICATIONS

This non-provisional application is a continuation of U.S. patent application Ser. No. 16/761,775, filed May 5, 2020, which is the U.S. National Phase under 35 U.S.C. § 371 of International Application No. PCT/JP2018/006839, filed on Feb. 26, 2018, the entire contents of which are incorporated herein by reference.

TECHNICAL FIELD

The present invention relates to a mobile information terminal and a control method thereof.

BACKGROUND ART

The spread of mobile information terminals such as smart phones and tablet terminals has been advanced. The mobile information terminal is capable of storing a lot of personal information and also has functions such as money transactions and various settlement processing. For this reason, when a mobile information terminal is used without permission by a third party, personal information leakage damage, financial damage, etc. may occur.

In order to prevent the damage, the mobile information terminal has a terminal lock function of restricting a terminal function. It is common that after authenticating an authorized user at power-on or in returning from a sleep state or the like, the restriction of the terminal function is temporarily released to enable its operation. Further, as in Patent Literature 1 described below, there is also a technique in which even after authenticating an authorized user by fingerprint authentication processing and then logging on to a computer, the confirmation of the authorized user is repeated by periodical face authentication processing, and logging off from a computer is automatically done when the collation does not indicate a match, thereby restricting operations by other than the authorized user to improve security.

CITATION LIST

Patent Literature

PTL 1: Japanese Patent Application Laid-Open No. 2011-13855

SUMMARY OF INVENTION

Technical Problem

A mobile information terminal such as a smart phone or a tablet terminal has a camera function, and an image photographed using the camera function is recorded in a storage unit of the mobile information terminal. When the authorized user of the mobile information terminal desires to show the image recorded in the storage unit to a friend or the like, the mobile information terminal may be handed over to the friend or the like in an activated state of an image viewing application to make the friend or the like operate the image viewing application.

In this case, the authorized user of the mobile information terminal allows the friend or the like to operate the image viewing application, but does not want to allow other operations. That is, the mobile information terminal has a non-designated application lock function in addition to the terminal lock function. An operation of a predetermined application (the image viewing application in the above example) selected by the authorized user by the non-designated application lock function is allowed for all operators. However, it is desirable that the mobile information terminal is controlled so as to restrict other operations except when the authorized user is the operator. However, Patent Literature 1 above does not describe such control as to restrict other operations of the terminal function according to the operator while allowing some operations of the terminal function without depending on the operator.

Further, there is a mobile information terminal having an access guide function which restricts use of those other than one application displayed on the screen. In the mobile information terminal having the access guide function, the access guide function is used in a state in which the image viewing application is activated, thereby making it possible to restrict operations other than the image viewing application so that they are prevented from being executed. However, in the state in which the access guide function is used, other operations are restricted even for not only the friend or the like but also the authorized user of the mobile information terminal. In order to perform other operations, even if the operator is the authorized user of the mobile information terminal, it is necessary to terminate the use of the access guide function through authentication processing. Further, it cannot be said that the termination of use of the access guide function is desirable usability such as other operations being possible even for other than the authorized user of the mobile information terminal.

An object of the present invention is to provide a mobile information terminal capable of restricting a terminal function according to an operator, and a control method thereof.

Solution to Problem

The techniques described in the claims are used as means for solving the above-mentioned problems.

To give an example, a control method for a mobile information terminal is used which is characterized by receiving an operation for restricting an operation for an application of the mobile information terminal by a user other than an authorized user of the mobile information terminal, authenticating whether or not the user is the authorized user of the mobile information terminal, allowing the operation for the application of the mobile information terminal when the user is authenticated to be the authorized user, and restricting the operation for the application of the mobile information terminal when the user is not authenticated to be the authorized user.

Advantageous Effects of Invention

According to the present invention, it is possible to provide a mobile information terminal capable of restricting a terminal function according to an operator, and a control method thereof.

BRIEF DESCRIPTION OF DRAWINGS

FIG. 1B is an external view of the mobile information terminal according to Example 1.

FIG. 1C is a software configuration diagram of the mobile information terminal according to Example 1.

FIG. 2C is a screen display diagram of a PIN input screen at the time of user authentication processing in Example 1.

FIG. 2D is a screen display diagram of a home screen in a normal operating state of Example 1.

FIG. 4 is an external view of an HMD type mobile information terminal according to Example 1.

DESCRIPTION OF EMBODIMENTS

Hereinafter, examples of an embodiment will be described with reference to the drawings.

Example 1

A mobile information terminal 100 of the present example includes a non-designated application lock function of allowing all operators to operate a predetermined application selected by an authorized user, but performing appropriate restrictions on other operations unless the authorized user is an operator. The mobile information terminal 100 may be a mobile phone or a smart phone, a tablet terminal, or the like. It may be a PDA (Personal Digital Assistant), a notebook PC (Personal Computer), an electronic book reader, or the like. Further, it may be a digital still camera or a movie shootable video camera, a portable game machine or the like, or other digital equipment.

[Hardware Configuration Example of Mobile Information Terminal]

Figure 1A:
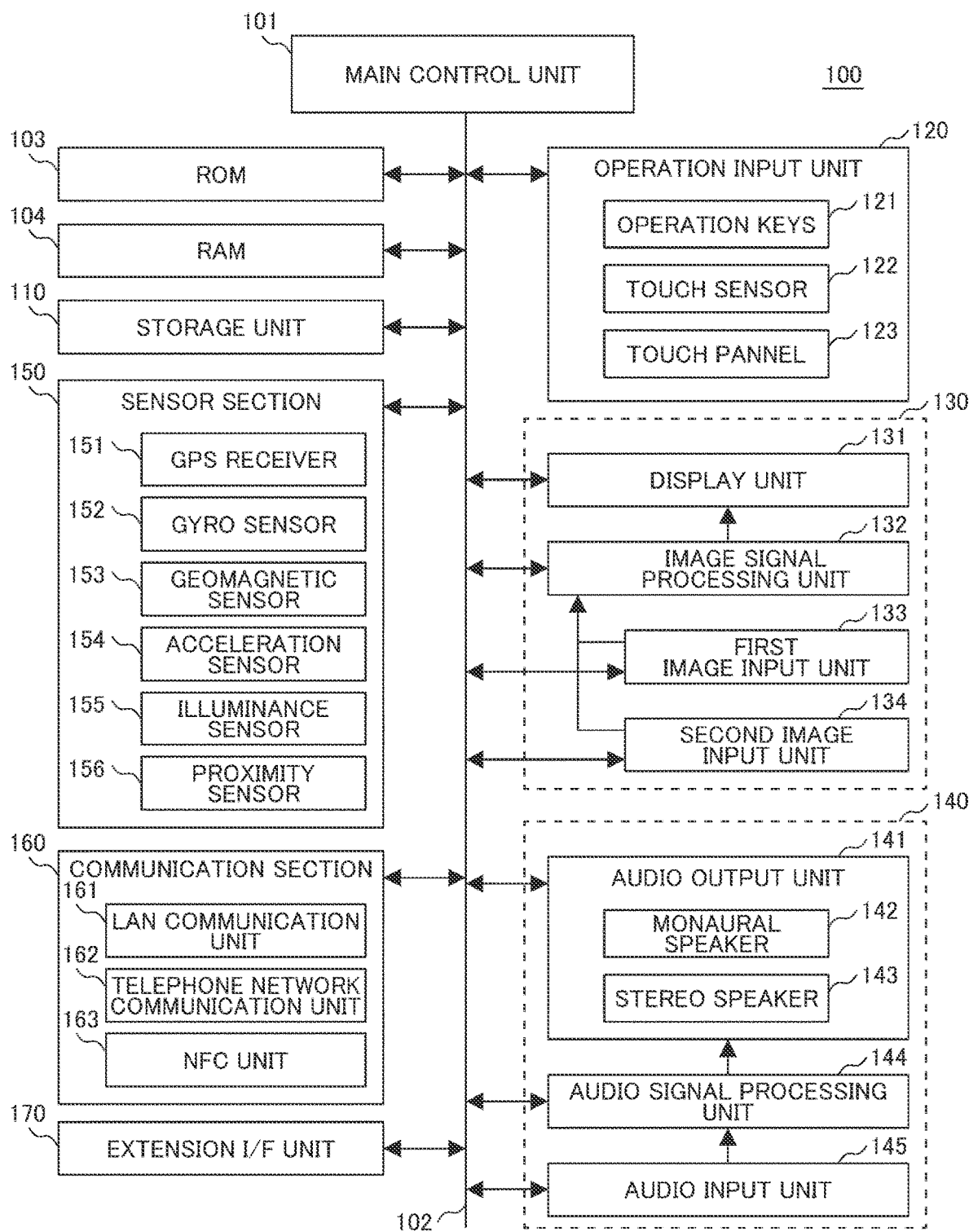
FIG. 1A is a hardware configuration diagram of a mobile information terminal according to Example 1.

FIG. 1A is a hardware configuration diagram showing an example of an internal configuration of the mobile information terminal 100. The mobile information terminal 100 is constituted of a main control unit 101, a system bus 102, a ROM 103, a RAM 104, a storage unit 110, an operation input unit 120, an image processing section 130, an audio processing section 140, a sensor section 150, a communication section 160, and an extension interface unit 170.

The main control unit 101 is a microprocessor unit which controls the entire mobile information terminal 100 according to a predetermined operation program. The system bus 102 is a data communication path for performing transmission/reception of various commands and data between the main control unit 101 and each operation block in the mobile information terminal 100.

The ROM (Read Only Memory) 103 is a memory which stores therein a basic operation program and other operation programs (application, hereinafter the same) of an operating system or the like. For example, a rewritable ROM like an EEPROM (Electrically Erasable Programmable ROM) or a flash ROM is used. The RAM (Random Access Memory) 104 serves as a work area at the time of execution of the basic operation program and other operation programs. The ROM 103 and the RAM 104 may be integrally formed with the main control unit 101. Further, the ROM 103 may use some storage area in the storage unit 110 without adopting such an independent configuration as shown in FIG. 1A.

The storage unit 110 stores operation programs and operation set values of the mobile information terminal 100, and personal information and authentication information of the authorized user of the mobile information terminal 100, etc. It is also capable of storing an operation program downloaded from on a network, various data created by the operation program, etc. Further, it is capable of storing contents of moving images, still images, audio or the like downloaded from on the network. In addition, it is capable of storing moving images, still images, etc. captured using the camera function. All or part of the function of the ROM 103 may be replaced with a partial area of the storage unit 110. Moreover, the storage unit 110 is required to hold the information stored even in a state of no power supply being supplied to the mobile information terminal 100 from outside. Thus, for example, devices such as a semiconductor device memory such as a flash ROM, an SSD (Solid State Drive), or the like, a magnetic disk drive such as an HDD (Hard Disc Drive) or the like, etc. are used.

Note that each operation program stored in the ROM 103 and storage unit 110 can be updated and expanded in function by download processing from each server device on the network.

The operation input unit 120 is an instruction input unit to input operation instructions to the mobile information terminal 100. The operation input unit 120 is constituted of operation keys 121 with button switches or the like arranged therein, a touch sensor 122 which detects that based on a change in capacitance, the finger of the operator touches, and a touch panel 123 disposed to overlap the display unit 131. The operation input unit 120 may further be provided with other operation devices. The operation of the mobile information terminal 100 may be performed by using a keyboard or the like connected to the extension interface unit 170. The operation of the mobile information terminal 100 may be performed by using a separate mobile terminal device connected by wire communication or wireless communication. Incidentally, the touch sensor 122 has a function of detecting a fingerprint or palm print of the fingers touching a sensor unit.

The image processing section 130 is constituted of a display unit 131, an image signal processing unit 132, a first image input unit 133, and a second image input unit 134. The display unit 131 is, for example, a display device such as a liquid crystal panel and provides image data processed by the image signal processing unit 132 to the operator of the mobile information terminal 100. The image signal processing unit 132 includes a video RAM whose illustration is omitted. The display unit 131 is driven based on the image data input to the video RAM. Further, the image signal processing unit 132 has a function of optionally performing decoding processing of an encoded video signal, format conversion processing, superimposing processing of menu and other OSD (On Screen Display) signal, etc. The first image input unit 133 and the second image input unit 134 are a camera unit which, by converting light input from the lens into an electrical signal by using an electronic device such as a CCD (Charge Coupled Device) or a CMOS (Complementary Metal Oxide Semiconductor) sensor, inputs image data of surroundings and an object.

The audio processing section 140 is constituted of an audio output unit 141, an audio signal processing unit 144, and an audio input unit 145. The audio output unit 141 is a speaker and provides a voice signal processed by the audio signal processing unit 144 to the operator of the mobile information terminal 100. In particular, a monaural speaker 142 performs the output of monaural audio at the time of voice speech communication or the like. The stereo speaker 143 performs the output of the stereo audio at the time of music playback or the like. The audio signal processing unit 144 has a function of performing decoding processing of encoded audio signals, etc. as needed. The audio input unit 145 is a microphone and converts the voice of the operator or the like into audio data and input the same.

The sensor section 150 is a sensor group for detecting the state of the mobile information terminal 100. The sensor section 150 is constituted of a GPS (Global Positioning System) receiver 151, a gyro sensor 152, a geomagnetic sensor 153, an acceleration sensor 154, an illuminance sensor 155, and a proximity sensor 156. The position, inclination, direction and motion of the mobile information terminal 100, and its surrounding brightness, the proximity state of surrounding objects, and the like can be detected by the sensor group of these. Also, the mobile information terminal 100 may further be provided with other sensors such as a pressure sensor, etc.

The communication section 160 is constituted of a LAN (Local Area Network) communication unit 161, a telephone network communication unit 162, and an NFC (Near Field Communication) unit 163. The LAN communication unit 161 is connected to a network such as the Internet via an access point, and performs transmission and reception of data to and from each server device on the network. The connection with the access point or the like may be performed by wireless connection such as Wi-Fi (registered trademark). The telephone network communication unit 162 performs telephone communications (call) and transmission/reception of data by wireless communication with a base station such as a mobile telephone communication network. The communication with the base station or the like may be performed by the W-CDMA (Wideband Code Division Multiple Access) (registered trademark) system or the LTE (Long Term Evolution) system or the like. The NFC unit 163 performs wireless communication when the corresponding reader and writer come close to each other. The LAN communication unit 161, the telephone network communication unit 162, and the NFC unit 163 are respectively provided with a coding circuit, a decoding circuit, an antenna, etc. Also, the communication processing section 160 may further include other communication units such as a BlueTooth (registered trademark) communication unit, an infrared communication unit, etc.

The extension interface unit 170 is an interface group for extending the function of the mobile information terminal 100. The extension interface unit 170 is constituted of a video/audio interface, a USB (Universal Serial Bus) interface, a memory interface, etc. The video/audio interface performs the input of a video signal/audio signal from an external video/audio output device, the output of the video signal/audio signal to an external video/audio input device, etc. The USB interface performs transmission/reception of data by connecting to a PC or the like. Also, it may perform the connection of a keyboard and other USB devices. Further, it may be used during charging of a built-in battery whose illustration is omitted. The memory interface performs transmission/reception of data by connecting a memory card or other memory media.

Note that the configuration example of the mobile information terminal 100 shown in FIG. 1A also includes many configurations not essential in the present example, but even in a configuration having no these, the effects of the present example are not impaired. Further, unillustrated configurations such as a digital broadcast receiving function, an electronic money settlement function, and the like may be further added.

[Appearance Examples of Mobile Information Terminal]

FIG. 1B is an external view illustrating an example of the appearance of the mobile information terminal 100. Incidentally, the same figure illustrates examples of a front surface (surface) figure and a rear (back) figure of the mobile information terminal 100 when the mobile information terminal 100 is a smart phone, etc., and illustration of the left and right side surfaces and the top and bottom surfaces, etc. thereof is omitted.

In front of the mobile information terminal 100, an operation indicator 124, a first image input unit 133, a monaural speaker 142, and a touch screen 180 are provided. The operation indicator 124 notifies an operation state of the mobile information terminal 100 according to the presence or absence of lighting/flashing of an LED (Light Emitting Diode). The touch screen 180 is constituted of a touch panel 123 and a display unit 131.

At the back surface of the mobile information terminal 100, a touch sensor 122, a second image input unit 134, an auxiliary light emitter 135, and a stereo speaker 143 are provided. The auxiliary light emitter 135 is capable of emitting auxiliary light for compensating for the shortage of light quantity at the time of image input from the second image input unit 134.

A power key 121p which is one of the operation keys 121 is provided at the upper surface of the mobile information terminal 100. An audio input unit 145, and a p-USB input unit 170u, which is one of the extension interface unit 170, are provided at the lower surface of the mobile information terminal 100.

Incidentally, as shown in the same figure, the first image input unit 133 is arranged on the front, and the second image input unit 134 is disposed on the rear surface being a surface different from the first image input unit 133. In the following, the first image input unit 133 may be referred to as [in-camera], and the second image input unit 134 may be referred to as rout-camera. The touch sensor 122 may be disposed on the side surface or the front lower part (portion not overlapping the touch screen 180), or the like without being disposed on the back surface of the mobile information terminal 100. Further, the touch panel 123 constituting the touch screen 180 may also have the function of the touch sensor 122. In this case, the function of the touch sensor 122 (e.g., fingerprint authentication function) can be performed at any position on the touch screen 180.

[Software Configuration Example of Mobile Information Terminal]

FIG. 1C is a software configuration diagram of the mobile information terminal 100, and shows an example of software configurations in the storage unit 110 (or the ROM 103, hereinafter the same) and the RAM 104. A basic operation program 1001, a lock control program 1002, a user authentication program 1003, and other operating programs 1009 are stored in the storage unit 110. Further, the storage unit 110 includes an authentication information storage area 1011 storing the authentication information of the authorized user of the mobile information terminal 100, and a various information storage area 1019 storing other information.

The basic operation program 1001 stored in the storage unit 110 is expanded into the RAM 104, and further the main control unit 101 executes the expanded basic operation program to configure a basic operation function unit 1101. Similarly, the lock control program 1002, the user authentication program 1003, and the other operating programs 1009 are respectively expanded into the RAM 104, and further the main control unit 101 executes the respective expanded operation programs to configure a lock control function unit 1102, a user authentication function unit 1103, and an other operation function unit 1109. The RAM 104 includes a temporary storage area 1200 which temporarily stores as necessary, data produced in executing the respective operation programs.

Incidentally, in order to simplify explanation below, the main control unit 101 expands the basic operation program 1001 stored in the storage unit 110 into the RAM 104 and executes it, and thereby processing of controlling each operation block is described assuming that the basic operation function unit 1101 controls the respective operation blocks. Other operation programs are also similarly described.

The lock control function unit 1102 includes two types of lock control functions. The first is a terminal lock function and performs control of setting the operation state of the mobile information terminal 100 to a terminal locked state in which the operations of various functions of the mobile information terminal 100 are limited collectively, or a terminal unlocked state in which the operations of various functions of the mobile information terminal 100 are permitted appropriately. The terminal locked state is a state of receiving operation instructions such as on/off of power of the mobile information terminal 100, on/off of a sleep operation, and user authentication processing to release the terminal locked state, etc., and not receiving other operation instructions. However, the functions automatically performed by the terminal system such as a search and mail checks for an access point or a base station or the like may be allowed as appropriate. The second is a non-designated application lock function, which in the terminal unlocked state, performs lock control for every function of the mobile information terminal 100 such that the operation of the predetermined application selected by the authorized user is allowed for all operators, but other operations are appropriately limited except for the case where the authorized user is an operator.

The user authentication function unit 1103 mainly controls the user authentication processing for confirming whether the operator of the mobile information terminal 100 is the authorized user. As a method for the user authentication processing, there are known a PIN (Personal Identification Number) input method, a password input method, a pattern input method, a face authentication method, an iris authentication method, a fingerprint authentication method, a palmprint authentication method, a voiceprint authentication method, etc. Any of them may be adopted. Other methods may be adopted. Incidentally, in the present example, at the time of control by a terminal lock function portion 1102T, PIN input processing is used as the user authentication processing method. At the time of control by a non-designated application lock function portion 1102A, face authentication processing or fingerprint authentication processing is used.

Note that when the product is shipped, the respective operation programs may be a state of being stored in advance in the storage unit 110 and/or ROM 103. After the product shipment, they may be acquired from each server apparatus on the network via the LAN communication unit 161 or the telephone network communication unit 162 or the like. Further, the respective operation programs stored in the memory card or an optical disk or the like may be obtained through the extension interface unit 170 or the like.

[Operation State Transition Example of Mobile Information Terminal]

Figure 2A:
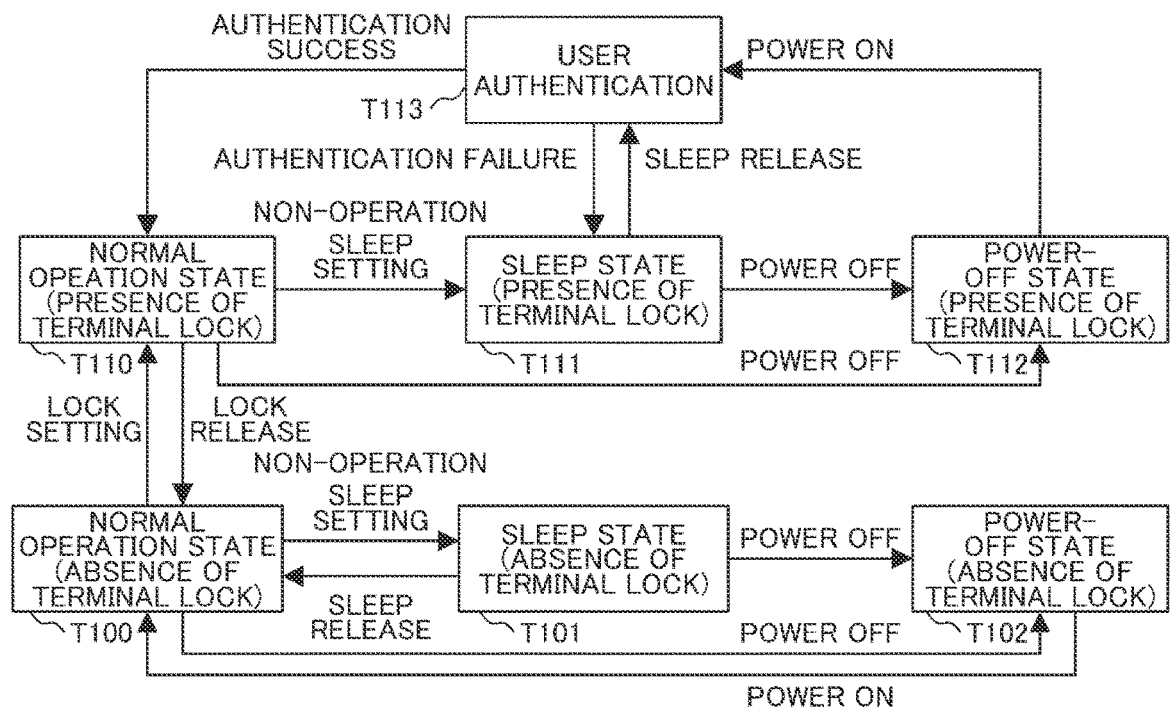
FIG. 2A is an operating state transition diagram of the mobile information terminal according to Example 1.

FIG. 2A is an operation state transition diagram describing an example of a transition status of the operation state of the mobile information terminal 100. The operation state transition shown in the same figure relates mainly to the terminal lock function controlled by the terminal lock function portion 1102T.

The mobile information terminal 100 is capable of setting (validating)/releasing (invalidating) a terminal lock function according to the instruction for operating the function menu or the like. That is, according to the operation instruction for the setting/release of the terminal lock function, the mobile information terminal 100 is capable of switching between a normal operation state T100 in a state in which the terminal lock function is invalidated and a normal operation state T110 in a state in which the terminal lock function is validated. At this time, the user authentication processing may be required.

Further, in the state in which the terminal lock function is invalidated, the mobile information terminal 100 of the normal operation state T100 is transitioned to a sleep state T101 when a predetermined time or more has elapsed without operation or when the operator has instructed transition to the sleep state. Moreover, when the operator instructs power-off in the normal operation state T100 or sleep state T101, the mobile information terminal 100 is transitioned to a power-off state T102. When the operator instructs the release of the sleep state in the sleep state T101 or the operator instructs power-on in the power-off state T102, the mobile information terminal 100 is transitioned to the normal operation state T100.

On the other hand, in the state in which the terminal lock function is validated, the mobile information terminal 100 of the normal operation state T110 is transitioned to a sleep state T111 when a predetermined time or more has elapsed without operation or when the operator has instructed transition to the sleep state. Moreover, when the operator instructs power-off in the normal operation state T110 or sleep state T111, the mobile information terminal 100 is transitioned to a power-off state T112. When the operator instructs the release of the sleep state in the sleep state T111 or when the operator instructs power-on in the power-off state T112, the mobile information terminal 100 performs the user authentication processing (T113). When the operator succeeds in authentication in the user authentication processing (T113), the mobile information terminal 100 temporarily releases the terminal lock function to be transitioned to the normal operation state T110. That is, the normal operation state T110 is a state in which the terminal lock function is validated and an operation state in which the terminal lock function is temporarily released. Further, when the authentication of the operator fails in the user authentication processing (T113), the mobile information terminal 100 is transitioned to the sleep state T111. Alternatively, the user authentication processing (T113) is repeated.

Incidentally, in the present example, the control of the above-described non-designated applications lock function becomes effective in the normal operation state T110. The control of the non-designated application lock function may be made effective even in the normal operation state T100. The details of the operation of the non-designated application lock function will be described later.

Figure 2B:
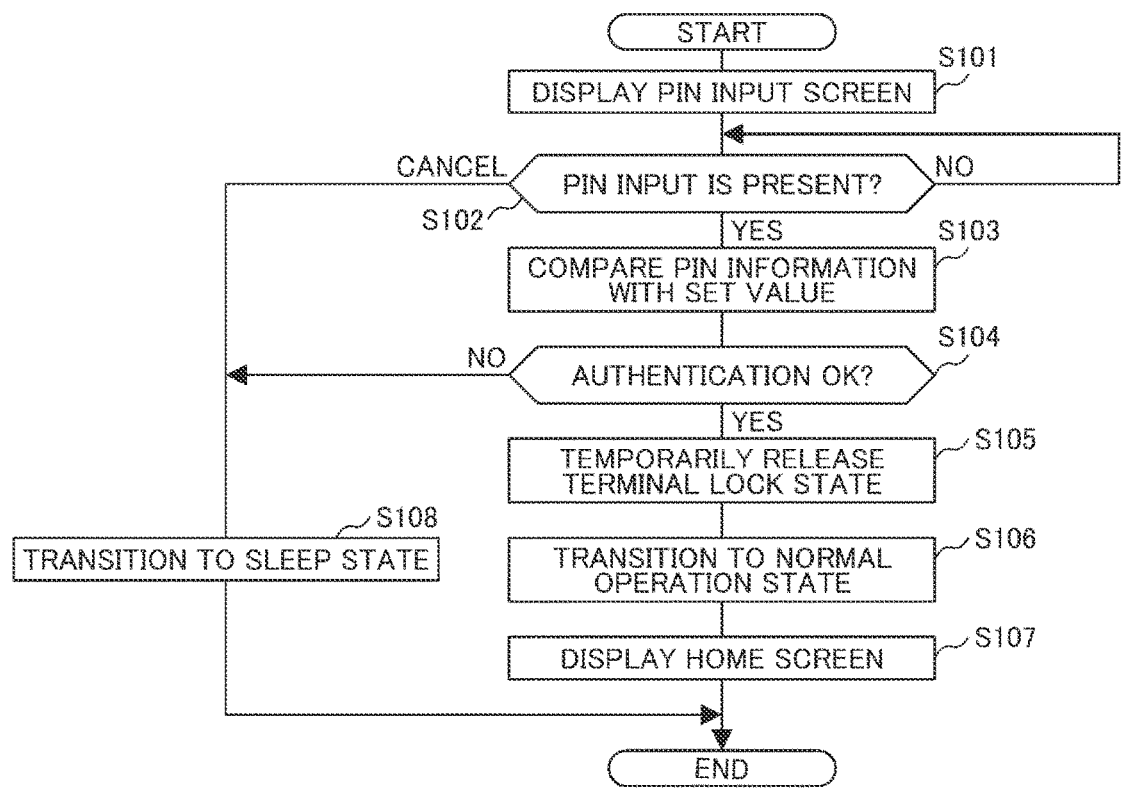
FIG. 2B is a flowchart of terminal lock function temporary release processing of the mobile information terminal according to Example 1.

FIG. 2B is a flowchart of an example of temporary release processing of the terminal lock function based on the user authentication processing (T113).

When the operator has instructed sleep release in the sleep state T111 or when the operator has instructed power-on in the power-off state T112, the terminal lock function portion 1102T requests the activation of a PIN input processing portion 1103P of the user authentication function unit 1103, and the basic operation function unit 1101 starts up the PIN input processing portion 1103P.

Next, the PIN input processing portion 1103P displays a PIN input screen 180a on the touch screen 180 (display unit 131) (S101). Subsequently, the PIN input processing portion 1103P confirms the presence or absence of a PIN input by the touch operation of the operator to the touch screen 180 (touch panel 123) (S102). When the PIN input to the touch screen 180 is absent or when the touch operation is confirmed not to be the PIN input (S102: No), the PIN input processing portion 1103P repeats the processing of S102. When the touch operation is confirmed to be a cancellation instruction for the PIN input (S102: Cancel), the PIN input processing portion 1103P is transitioned to the sleep state T111 as a failure in authentication (S108). When there is a touch operation to the touch screen 180, and the touch operation is confirmed to be a PIN input (S102: Yes), the PIN input processing portion 1103P proceeds to processing of S103. Next, the PIN input processing portion 1103P compares the PIN information input in the processing of S102 with the authentication information preset by the authorized user and stored in the authentication information storage area 1011, and transmits its result to the terminal lock function portion 1102T of the lock control function unit 1102 (S103).

The terminal lock function portion 1102T determines in accordance with the transmitted comparison result whether the PIN information input in the processing of S102 and the authentication information preset by the authorized user and stored in the authentication information storage area 1011 coincide with each other. When it is determined that both of them coincide with each other (S104: Yes), the terminal lock function portion 1102T temporarily releases the terminal lock function of the mobile information terminal 100 as an authentication success (S105) to be transitioned to the normal operation state T110 (S106), and displays a home screen 180b on the touch screen 180 (S107). On the other hand, when the PIN information input in the processing of S102 and the authentication information preset by the authorized user and stored in the authentication information storage area 1011 are determined not to coincide with each other (S104: No), the terminal lock function portion 1102T is transitioned to the sleep state T111 as an authentication failure (S108). Incidentally, in the case of the authentication failure, the operation state of the mobile information terminal 100 may be transitioned to the power-off state T112 as an alternative to the processing of transitioning to the sleep state T111 or may also be returned to the processing of S101.

FIG. 2C is a screen display diagram of an example of the PIN input screen, which is displayed in the processing of the flowchart shown in FIG. 2B.

The PIN input screen 180a is constituted of a numeric keyboard area 180a1, an input result display area 180a2, and an other information display area 180a3. The numeric keyboard area 180a1 becomes an effective area of the touch operation at the time of the PIN input. The input result display area 180a2 is an area displaying the result of the operator's touch operation onto the numeric keyboard area 180a1. By displaying characters such as ⌈·⌋ or ⌈*⌋ where the operator has performed a touch operation to the numeric keyboard area 180a1, it is informed that the mobile information terminal 100 has received an operation instruction of the operator. The other information display area 180a3 is an area displaying general information such as time information and weather information.

FIG. 2D is a screen display diagram of an example of the home screen, which is displayed in the processing of the flowchart shown in FIG. 2B.

The home screen 180b is constituted of a main function icon display area 180b1, a general icon display area 180b2, an other information display area 180b3, and a control key area 180b4. The main function icon display area 180b1 is a display are of an icon associated with the primary application that is frequently used in the mobile information terminal 100. The general icon display area 180b2 is a display area of an icon associated with other applications. The other information display area 180b3 is an area displaying general information such as time information and weather information. The control key area 180b4 is an area displaying a ⌈back key⌋ or ⌈home key⌋, and ⌈application history key⌋.

[Operation Control Example of Non-Designated Application Lock Function]

In the following, the operation control processing of the non-designated application lock function will be described by taking, as an example, a case where the authorized user of the mobile information terminal 100 lends the mobile information terminal 100 to friends or the like in a state in which the image viewing application is selected and activated, in order to show the camera captured images recorded on the various information storage area 1019 of the storage unit 110 to the friends or the like. Note that the application selected by the authorized user is not limited to the image viewing application.

Figure 3A:
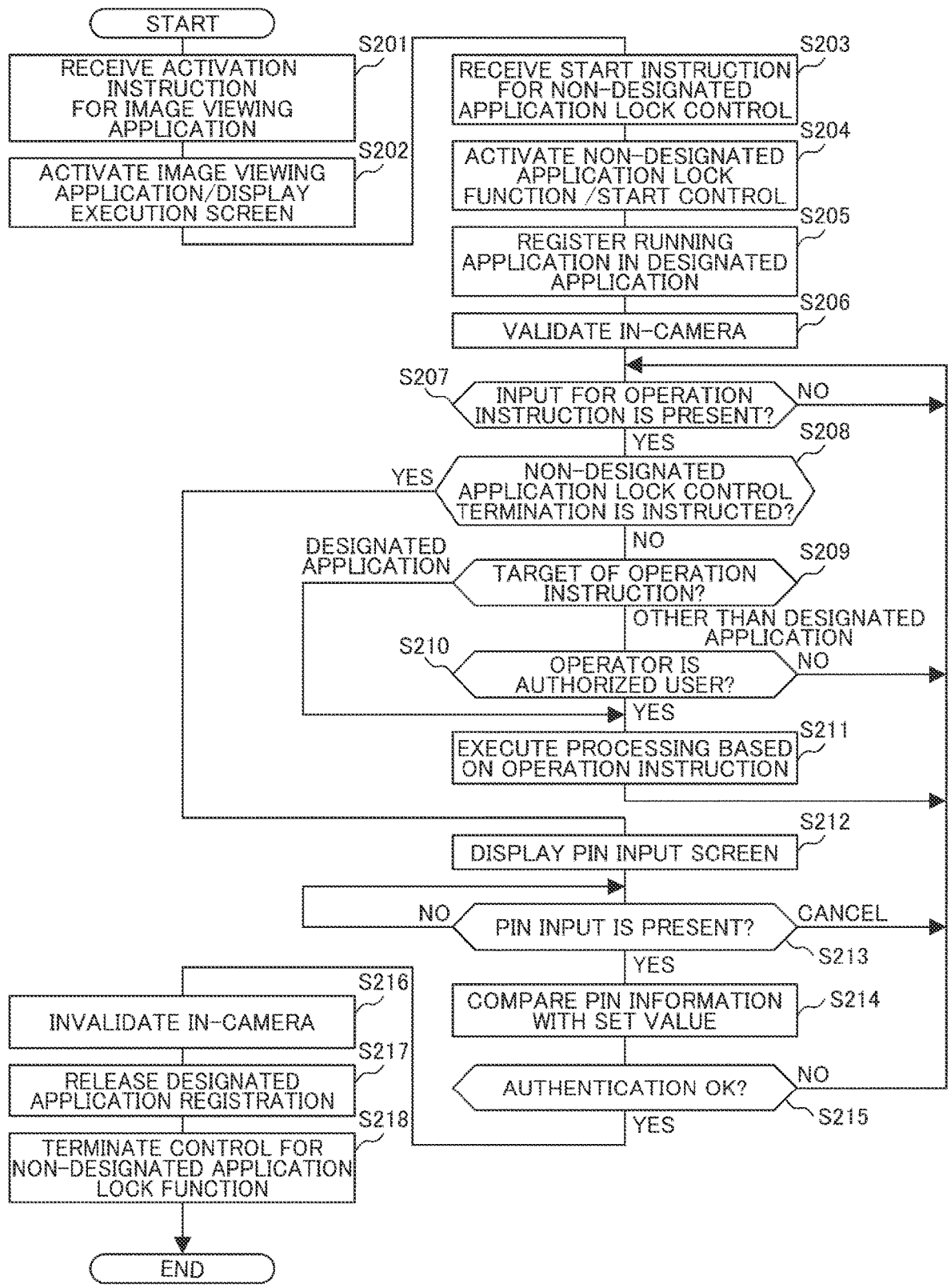
FIG. 3A is a flowchart of a non-designated application lock function of the mobile information terminal according to Example 1.

FIG. 3A is a flowchart of an example of the operation control processing of the non-designated application lock function. The processing of the flowchart shown in the same figure mainly relates to the non-designated application lock function controlled by the non-designated application lock function portion 1102A. Incidentally, the control of the non-designated application lock function portion 1102A may be carried out independently of the control of the aforementioned terminal lock function portion 1102T.

When the image viewing application is used in the mobile information terminal 100 of the normal operation state T110, the operator operates the touch screen 180 with the home screen 180b being displayed thereon to instruct the activation of the image viewing application (S201). The activation instruction of the image viewing application may be performed by the tapping of an icon associated with the image viewing application displayed in the main function icon display area 180b1 or the general icon display area 180b2. Then, the basic operation function unit 1101 activates an unillustrated image viewing application function portion of the other operation function unit 1109 in accordance with an instruction of the operator. The image viewing application function portion displays an image viewing application execution screen 180c (FIG. 3B) on the touch screen 180 (S202).

Next, the operator instructs a non-designated application lock function control start in a state in which the image viewing application execution screen 180c is displayed on the touch screen 180 (S203). Then, the basic operation function unit 1101 starts up the non-designated application lock function portion 1102A of the lock function control unit 1102 in accordance with an instruction of the operator (S204). The non-designated application lock function portion 1102A stores (registers) a running application (image viewing application in the present example), as a designated application operable by both of the authorized user and other users other than the authorized user by an instruction of the operator (S205), and further requests the validation of the in-camera 133, and the activation of the face authentication processing portion 1103F. Although the following has been described on the assumption that the running application is registered as a designated application, an application other than that during execution, which is designated by the operator from the operation input unit 120, may be recognized and registered as a designated application. The basic operation function unit 1101 validates the in-camera 133 in response to the request to activate the face authentication processing portion 1103F (S206). The face authentication processing portion 1103F starts face authentication processing based on an image acquired by the in-camera 133.

Incidentally, as the instruction for the non-designated application lock function control start, a double tap or a triple tap or the like may be performed on the [home key] in a state in which the image viewing application execution screen 180c is displayed on the touch screen 180. The instruction may be an operation of touching the [home key] and the [back key] simultaneously, tapping the [home key] in a state in which the finger is in contact with the touch sensor 122, or double-tapping the execution screen of an application (the image viewing application in the present example) running in a state in which the finger is in contact with the touch sensor 122, or the like. The instruction may be other predetermined operations.

Further, in order to prevent the instruction for the non-designated application lock function control start by the operator other than the authorized user of the mobile information terminal 100, in the processing of S203, confirmation (authentication processing) may be made as to whether the operator is the authorized user of the mobile information terminal 100.

Subsequently, the basic operation function unit 1101 confirms the presence or absence of an operation instruction input to the mobile information terminal 100 by the touch operation of the operator to the touch screen 180. The basic operation function unit 1101 repeats the processing of S207 where it is confirmed that the operation instruction input to the touch screen 180 is absent (S207: No). On the other hand, when it is confirmed that the operation instruction input to the touch screen 180 is present (S207: Yes), the basic operation function unit 1101 confirms whether the operation instruction is an instruction for a non-designated application lock function control termination (S208). When it is confirmed that the operation instruction input in the processing of S207 is the instruction for the non-designated application lock function control termination (S208: Yes), the basic operation function unit 1101 proceeds to the processing of S212. When it is confirmed that the operation instruction input in the processing of S207 is not the instruction for the non-designated application lock function control termination (S208: No), the basic operation function unit 1101 proceeds to the processing of S209.

Incidentally, as the instruction for the non-designated application lock function control termination, a double tap or a triple tap or the like may be performed on the [home key] in a state in which non-designated application lock control is being executed. The instruction may be an operation of touching the [home key] and the [back key] simultaneously, tapping the [home key] in a state in which the finger is in contact with the touch sensor 122, or double-tapping the execution screen of an application (the image viewing application in the present example) running in a state in which the finger is in contact with the touch sensor 122, or the like. The instruction may be other predetermined operations.

In the processing of S209, the non-designated application lock function portion 1102A confirms whether the operation instruction input in the processing of S207 is an operation instruction targeted for the application (image viewing application in the present example) stored as the designated application in the processing of S205 or an operation instruction targeted for other than the designated application (S209). When it is confirmed that the operation instruction input in the processing of S207 is the operation instruction targeted for the designated application (S209: designated application), the non-designated application lock function portion 1102A returns to the processing of S207 after the image viewing application function portion executes each processing based on the operation instruction (S211). On the other hand, when it is confirmed that the operation instruction input in the processing of S207 is the operation instruction targeted for other than the designated application (S209: other than the designated application), the non-designated application lock function portion 1102A further confirms whether the operator is the authorized user of the mobile information terminal 100 (S210). When it is confirmed in the processing of S210 that the operator is the authorized user of the mobile information terminal 100 (S210: Yes), the non-designated application lock function portion 1102A returns to the processing of S207 after each application function portion of the other operation function unit 1109 executes each processing based on the operation instruction input in the processing of S207 (S211). Further, when the operator is not confirmed to be the authorized user of the mobile information terminal 100 (S210: No), the non-designated application lock function portion 1102A returns to the processing of S207 without performing the operation instruction input in the processing of S207.

The confirmation performed in the processing of S210 as to whether the operator is the authorized user of the mobile information terminal 100 is performed by the face authentication method based on the control of the face authentication processing portion 1103F in the present example. That is, the face authentication processing portion 1103F analyzes the image acquired from the in-camera 133 to extract the operator's face image and compares the extracted face image with the face image of the authorized user previously stored in the authentication information storage area 1011. If the result of its comparison has the degree of coincidence more than a predetermined value, the face authentication processing portion 1103F regards the operator as the authorized user of the mobile information terminal 100. Incidentally, the processing of S210 may be executed each time an operation instruction input by the operator is received, while the non-designated application lock function control being performed, or may be executed at all times, or may be repeatedly performed at predetermined time intervals. Further, face images of authorized users to be stored in the authentication information storage area 1011 in advance may be a plurality of persons. In this case, the authorized user of the mobile information terminal 100 is present as plural.

In the processing of S212, the non-designated application lock function portion 1102A requests activation of the PIN input processing portion 1103P to confirm whether the instruction for the non-designated application lock function control termination input in the processing of S207 is made by the authorized user of the mobile information terminal 100. Then, the basic operation function unit 1101 activates the PIN input processing portion 1103P of the user authentication function unit 1103.

Next, the PIN input processing portion 1103P displays the PIN input screen 180a on the touch screen 180 (display unit 131) (S212). Subsequently, the PIN input processing portion 1103P confirms the presence or absence of the PIN input by the touch operation of the operator to the touch screen 180 (touch panel 123) (S213). When it is confirmed that there is no PIN input to the touch screen 180 or when the touch operation is confirmed not to be the PIN input (S213: No), the PIN input processing portion 1103P repeats the processing of S213. When the touch operation is confirmed to be a cancellation instruction for the PIN input (S213: Cancel), the PIN input processing portion 1103P returns to the processing of S207 as an authentication failure. In this case, the non-designated application lock function control is not finished. When the touch operation to the touch screen 180 is present, and the touch operation is confirmed to be the PIN input (S213: Yes), the PIN input processing portion 1103P proceeds to the processing of S214. Next, the PIN input processing portion 1103P compares the PIN information input in the processing of S213 with the authentication information preset by the authorized user and stored in the authentication information storage area 1011, and transmits its comparison result to the non-designated application lock function portion 1102A (S214).

The non-designated application lock function portion 1102A determines in accordance with the transmitted comparison result whether the PIN information input in the processing of S213 and the authentication information preset by the authorized user and stored in the authentication information storage area 1011 coincide with each other. When both are determined not to coincide with each other (S215: No), the non-designated application lock function portion 1102A returns to the processing of S207 as the authentication failure. In this case, the non-designated application lock function control is not finished. When it is determined that the PIN information input in the processing of S213 and the authentication information preset by the authorized user and stored in the authentication information storage area 1011 coincide with each other (S215: Yes), the non-designated application lock function portion 1102A requests the invalidation of the in-camera 133 and the termination of the operation of the face authentication processing portion 1103F as an authentication success. In response to the request, the basic operation function unit 1101 invalidates the in-camera 133 and terminates the operation of the face authentication processing portion 1103F (S216). Further, the non-designated application lock function portion 1102A releases the storage for the designated application performed in the processing of S205 (S217), and terminates the operation of the non-designated application lock function control (S218).

Figure 3B:
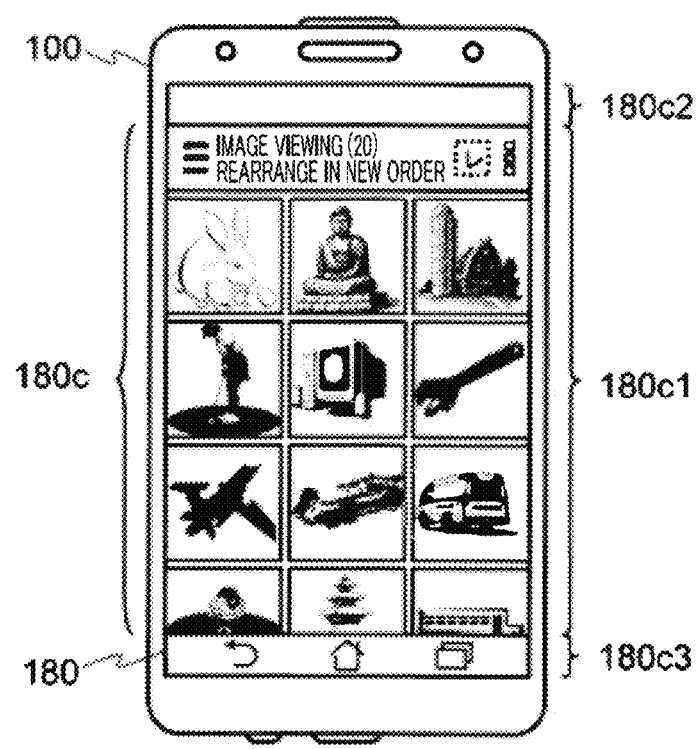
FIG. 3B is a screen display diagram of an image viewing application execution screen in Example 1.

FIG. 3B is a screen display diagram of an example of the image viewing application execution screen, which is displayed in the processing of the flowchart shown in FIG. 3A.

The image viewing application execution screen 180c is constituted of an image viewing area 180c1, a notification area 180c2, and a control key area 180c3. The image viewing area 180c1 is a main screen of the image viewing application execution screen 180c. A thumbnail screen of plural images, an enlarged screen of a selected image, etc. are displayed thereon. The notification area 180c2 is an area for notifying a radio wave strength, time, a battery residual quantity, and other information. The control key area 180c3 is an area displaying the [back key], the [home key], and the [Application history key].

[Operation Instruction Targeted for Designated Application and Operation Instruction Targeted for Other than Designated Application]

In the processing of S209 to S211 in the flowchart shown in FIG. 3A, processing flows are made different according to whether the operation instruction input in the processing of S207 is an operation instruction targeted for a designated application or an operation instruction targeted for other than the designated application. Specifically, when the operation instruction input in the processing of S207 is the operation instruction targeted for the designated application, the processing of S210 is not executed. When the operation instruction input in the processing of S207 is the operation instruction targeted for other than the designated application, the processing of S210 is executed.

Figure 3C:
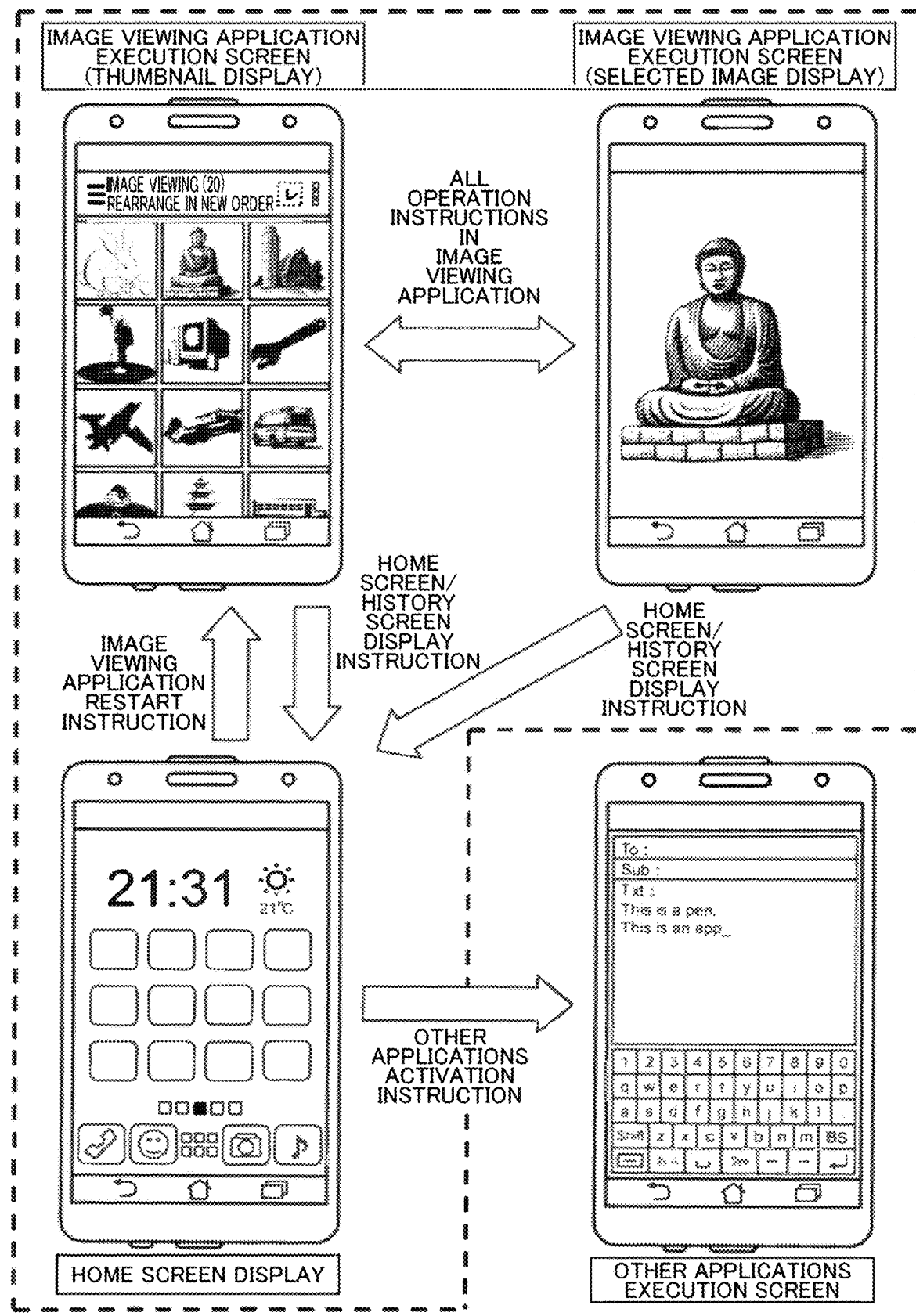
FIG. 3C is an operation conceptual diagram describing the range of operating instructions for a designated application in Example 1.

FIG. 3C is an operation conceptual diagram describing whether any of operation instructions with respect to the mobile information terminal 100 is an operation instruction targeted for a designated application, and any thereof is an operation instruction targeted for other than the designated application. In the same drawing, the upper left figure is a diagram of a thumbnail display screen which is an example of an execution screen of the image viewing application. The upper right figure is a diagram of a selected image display screen which is an example of an execution screen of the image viewing application. The lower left figure is a diagram of a home screen. The lower right figure is a diagram of an execution screen of a mail creation screen, which is an example of an execution screen of a mail application.

Consider a case where the non-designated application lock function control is started during the display of the thumbnail screen of the image viewing application. In this case, the image viewing application is stored as a designated application.

First, all operation instructions in the image viewing application being the designated application are, needless to say, operation instructions each targeted for a designated application. For example, they are operation instructions of selecting/enlarging one image data in the thumbnail display screen of the image viewing application to display the selected image display screen of the image viewing application, returning from the selected image display screen of the image viewing application to the thumbnail display screen, and changing the sort order in the thumbnail display screen, etc. Also, from the state in which the thumbnail display screen and the selected image display screen of the image viewing application are displayed, the tap operation of [home key] for displaying the home screen and the tap operation of [application history key] for displaying an application history screen (omitted in the figure) respectively also become the operation instruction targeted for the designated application. Further, a tap operation of an icon or the like for resuming the execution of the image viewing application from the home screen and the application history screen, or like also becomes an operation instruction targeted for the designated application.

On the other hand, an icon tap operation for activating the mail application (other applications being also similar) being an application other than the designated application from the home screen or the application history screen becomes an operation instruction targeted for other than the designated application.

That is, in FIG. 3C, each operation instruction to be carried out within a broken line is an operation instruction targeted for a designated application. Each operation instruction to be performed across the broken line, and each operation instruction to be performed outside the broken line are operation instructions each targeted for other than the designated application.

[Modification 1]

The processing of confirming the authorized user which is performed in the processing of S210 is not limited to the above-described face authentication method. For example, it may be a fingerprint authentication method or the like. In this case, in the processing of S206, as an alternative to each processing of invalidating the in-camera 133 and starting up the face authentication processing portion 1103F, the basic operation function unit 1101 may validate the touch sensor 122 and activate the fingerprint card processing portion 1103H. In the processing of S210, the fingerprint authentication processing portion 1103H may perform control so as to detect fingerprint data of an operator's finger contacting the touch sensor 122, compare the detected fingerprint data with the fingerprint data of the authorized user stored previously in the authentication information storage area 1011, and regard the operator as being the authorized user of the mobile information terminal 100 if the comparison result has a degree of coincidence more than a predetermined value. Further, in this case, in the processing of S216, the invalidation of the touch sensor 122 and the completion of operation of the fingerprint card processing portion 1103H may be performed according to the instruction for the non-designated application lock function control termination.

Also, the processing of confirming the authorized user which is performed in the processing of S210 may be different authentication methods such as an iris authentication method, a palm print authentication method, etc.

The processing of confirming the authorized user which is performed in S212 to S215 is not limited to the PIN input method described above. For example, the processing may be different authentication methods such as a password input method, a pattern input method, a face authentication method, an iris authentication method, a fingerprint authentication method, a palm print authentication method, a voice print authentication method, etc.

The processing of confirming the authorized user which is performed in S212 to S215 may be authentication processing common to the user authentication processing (T113) of FIG. 2A or authentication processing different therefrom. The common authentication processing may be performed using different authentication information.

[Modification 2]

Figure 3D:
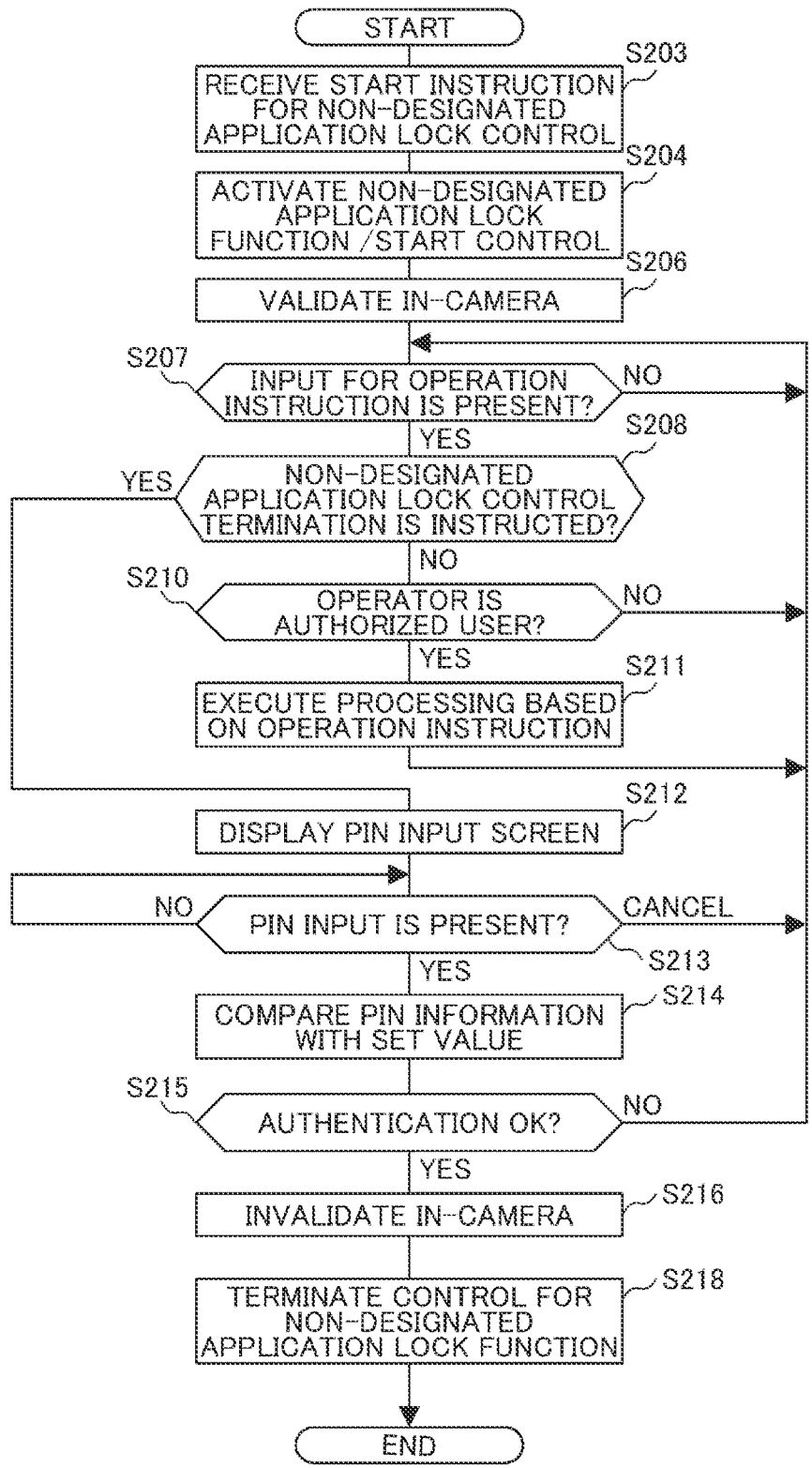
FIG. 3D is a flowchart of a non-designated application lock function of the mobile information terminal according to Example 1.

FIG. 3D is a flowchart of an example of operation control processing of the non-designated application lock function. In the example of the same figure, however, no application is stored (registered) as a designated application. In this case, the operator may instruct a non-designated application lock function control start in order to restrict operations on the application of the mobile information terminal 100 by a user other than the authorized user of the mobile information terminal 100 in a state in which the home screen 180b is displayed on the touch screen 180. According to the corresponding instruction, all the applications of the mobile information terminal 100 are recognized by the mobile information terminal 100 as applications other than the designated application.

When the flowchart of FIG. 3D is compared with FIG. 3A, each processing of S201, S202, S205, S209, and S217 is not executed. In other words, the non-designated application lock function portion 1102A confirms whether the operator is the authorized user of the mobile information terminal 100, assuming that all the operation instructions input in the processing of S207 are operation instructions targeted for other than the designated application (S210). When the operator is confirmed to be the authorized user of the mobile information terminal 100 in the processing of S210 (S210: Yes), the non-designated application lock function portion 1102A returns to the processing of S207 after execution of each processing based on the operation instruction input in the processing of S207 (S211). Further, when the operator is not confirmed to be the authorized user of the mobile information terminal 100 (S210: No), the non-designated application lock function portion 1102A returns to the processing of S207 without executing the operation instruction input in the processing of S207.

Therefore, all operation instructions for the mobile information terminal 100 are allowed only for the authorized user of the mobile information terminal 100.

[Modification 3]

FIG. 4 is an external view showing an example of an external appearance of a mobile information terminal 100g. Incidentally, the same figure illustrates an example of a front view, a top view, and left and right side views of the mobile information terminal 100g where the mobile information terminal 100 is a glasses-type information terminal device such as an HMD (Head Mount Display). Illustration of the back and bottom views and the like is omitted.

In the mobile information terminal 100g, a display unit 131L/131R is disposed on a spectacle-shaped lens portion. The display unit 131L/131R is a transmissive display, and a wearer (operator) can view a frontal landscape through the display unit 131L/131R and confirm the image data processed by the image signal processing unit 132 on the display unit 131L/131R. Further, a first image input unit 133L/133R is provided on the back surface of the mobile information terminal 100g, and a second image input unit 134L/134R is provided on the front surface of the mobile information terminal 100g.

Further, a touch sensor 122g and a stereo speaker 143L are provided on the left side surface of the mobile information terminal 100g. On the right side surface of the mobile information terminal 100g, a cursor key 121c, which is one of operation keys 121, and a stereo speaker 143R are provided. In addition, a power supply p-USB input unit 170u (omitted in the figure) may be provided on the left or right side surface of the mobile information terminal 100q.

When the operation control processing of the non-designated application lock function is performed by the mobile information terminal 100g which is the glasses-type information terminal device such as shown in the same figure, the processing of confirming the authorized user performed in the processing of S210 in the flowchart of FIG. 3A may be set as an iris authentication method. In this case, in the processing of S206, the in-camera 133L/133R (which may be either of them) may be activated, and the iris authentication processing portion (omitted in the figure) of the user authentication processing unit 1103 may be activated. Also, in the processing of S210, the iris authentication processing portion may perform control so as to analyze an image acquired from the in-camera 133L/133R to extract an iris image of the wearer (operator), compare the extracted iris image with the iris image of the authorized user stored in the authentication information storage area 1011 in advance, and regard the wearer (operator) as being the authorized user of the mobile information terminal 100 if its comparison result has a degree of coincidence more than a predetermined value. Further, in this case, in the processing of S216, the invalidation of the in-camera 133L/133R and the completion of operation of the iris authentication processing portion may be performed according to an instruction for a non-designated lock function control termination.

As described above, the mobile information terminal 100 according to the present example allows all operators to operate the predetermined application selected by the authorized user. In regard to other operations, however, the non-designated application lock function control which is appropriately restricted can be executed at other than where the authorized user is the operator. That is, it is possible to provide an easy-to-use mobile information terminal capable of appropriately limiting the terminal function according to the operator, and a control method thereof.

Example 2

Hereinafter, Example 2 will be described. A basic configuration of Example 2 is similar to that of Example 1. Hereinafter, differences between the present example and Example 1 will be mainly described, and the description of common portions will be omitted as much as possible to avoid their duplication.

[Operation Control Example of Non-Designated Application Lock Function]

In the following, operation control processing of a non-designated application lock function will be described by taking, as an example, a case where an authorized user of the mobile information terminal 100 lends the mobile information terminal 100 to friends or the like in a state in which an image viewing application is selected and activated, in order to show the camera captured images recorded on the various information storage area 1019 of the storage unit 110 to the friends or the like.

Figure 5:
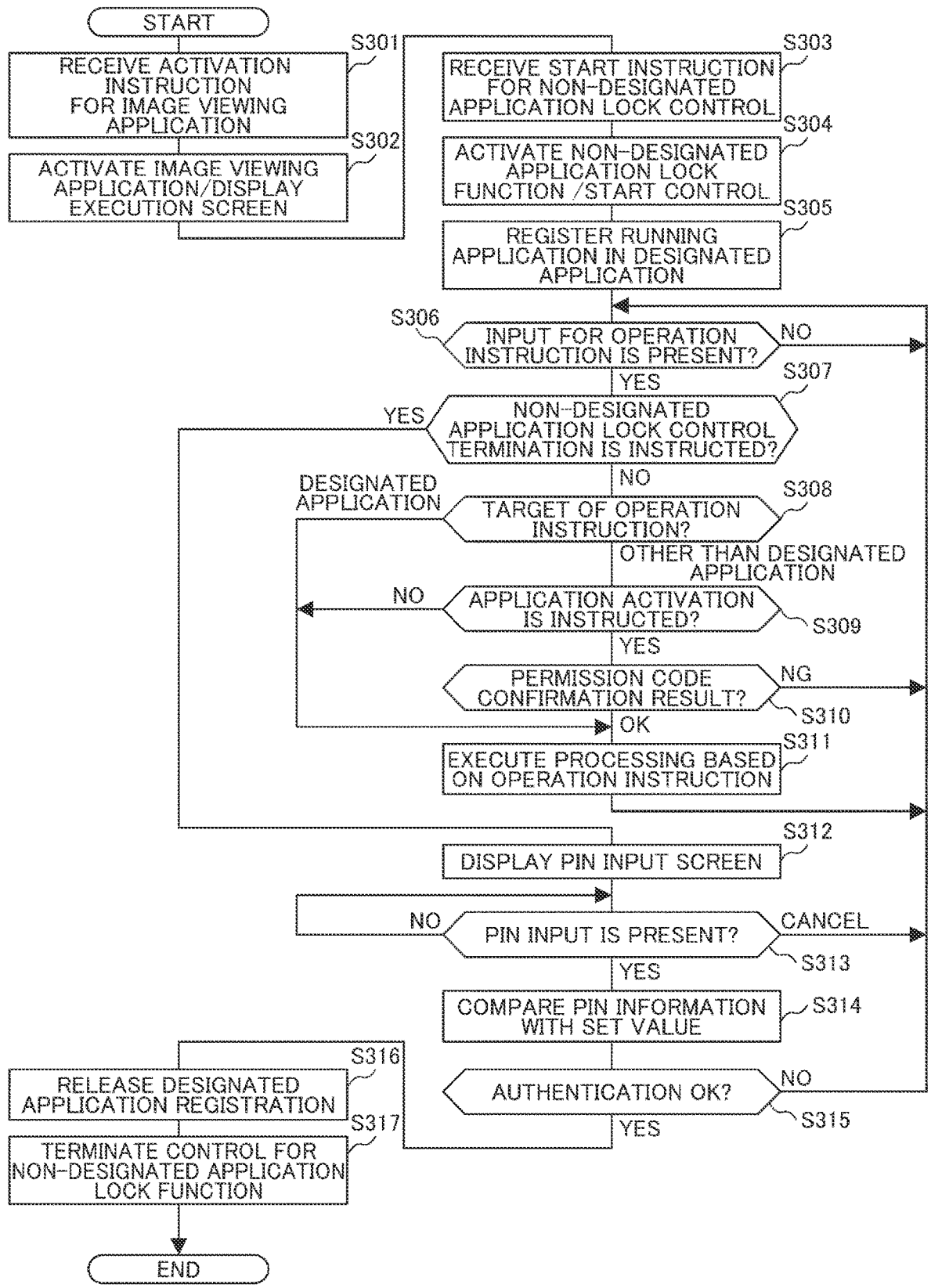
FIG. 5 is a flowchart of a non-designated application lock function of a mobile information terminal according to Example 2.

FIG. 5 is a flowchart of an example of the operation control processing of the non-designated application lock function. The processing of the flowchart shown in the same figure mainly relates to the non-designated application lock function controlled by the non-designated application lock function portion 1102A. Incidentally, the control of the non-designated application lock function portion 1102A may be carried out independently of the control of the aforementioned terminal lock function portion 1102T.

First, in the processing of S301 to S304, the same processing as S201 to S204 in the flowchart of FIG. 3A is performed. In other words, activation processing of an image viewing application and start processing of a non-designated application lock function control are performed according to an operation instruction from an operator.

Further, the non-designated application lock function portion 1102A stores an application being executed (in the present example, the image viewing application) as a designated application in accordance with an instruction from the operator (S305).

Subsequently, the basic operation function unit 1101 confirms whether or not an operation instruction is input to the mobile information terminal 100 by an operator's touch operation on the touch screen 180. When it is confirmed that there is no operation instruction input to the touch screen 180 (S306: No), the basic operation function unit 1101 repeats the processing of S306. When it is confirmed that there is an operation instruction input to the touch screen 180 (S306: Yes), the basic operation function unit 1101 confirms whether or not the operation instruction is an instruction to terminate the non-designated application lock function control (S307). When the operation instruction input in the processing of S306 is confirmed to be an instruction to terminate the non-designated application lock function control (S307: Yes), the basic operation function unit 1101 proceeds to processing of S312. Further, when the operation instruction input in the processing of S306 is confirmed not to be an instruction to terminate the non-designated application lock function control (S307: No), the basic operation function unit 1101 proceeds to processing of S308.

In the processing of S308, the non-designated application lock function portion 1102A confirms whether the operation instruction input in the processing of S306 is an operation instruction targeted for the application (the image viewing application in the present example) stored as the designated application in the processing of S305, or an operation instruction targeted for other than the designated application (S308). When the operation instruction input in the processing of S306 is confirmed to be the operation instruction targeted for the designated application (S308: designated application), the non-designated application lock function portion 1102A returns to the processing of S306 after the image viewing application function portion executes each processing based on the operation instruction (S311). When the operation instruction input in the processing of S306 is confirmed to be the operation instruction targeted for other than the designated application (S308: other than the designated application), the non-designated application lock function portion 1102A further confirms whether the operation instruction is an instruction to activate any application other than the designated application (S309).

In the processing of S309, when the operation instruction input in the processing of S306 is confirmed to be an instruction to activate any application other than the designated application (S309: Yes), the non-designated application lock function portion 1102A requires the operator to input a non-designated application activation permission code (S310). Specifically, the PIN input processing portion 1103P displays a PIN input screen 180a on the touch screen 180 based on the request from the non-designated application lock function portion 1102A. Here, if the operator inputs the non-designated application activation permission code set in advance and stored in the authentication information storage area 1011 as the PIN information, the non-designated application lock function portion 1102A executes processing based on the operation instruction, i.e., activation of any application other than the designated application (S311) assuming that the normal non-designated application activation permission code has been confirmed (S310: OK). On the other hand, if the operator cannot input the non-designated application activation permission code set in advance and stored in the authentication information storage area 1011 as the PIN information, the non-designated application lock function portion 1102A determines the normal non-designated application activation permission code not to be confirmed (S310: NG), and returns to the processing of S306 without executing the processing based on the operation instruction, i.e., the activation of any application other than the designated application. As the processing of confirming the non-designated application activation permission code in S310, processing similar to S212 to S215 in the flowchart of FIG. 3A may be performed.

In the processing of S309, when the operation instruction input in the processing of S306 is confirmed not to be an instruction to activate any application other than the designated application (S309: No), the non-designated application lock function portion 1102A returns to the processing of S306 after executing each processing based on the operation instruction (S311). That is, any application other than the designated application that has already been activated performs the confirmation processing of the non-designated application activation permission code in the processing of S310 at the time of activation, and is therefore judged to have been activated after obtaining the permission of the authorized user of the mobile information terminal 100. In addition, any application other than the designated application activated through the confirmation processing of the non-designated application activation permission code may be allowed in terms of operation for all operators without new authentication processing until the operation of the application is completed.

In the processing of S312 to S317, processing similar to S212 to S215 and S217 to S218 in the flowchart of FIG. 3A may be performed.

[Modification 1]

The processing of confirming the non-designated application activation permission code which is performed in the processing of S310 is not limited to the PIN input method described above. For example, the processing may be a password input method, a pattern input method, a face authentication method, an iris authentication method, a fingerprint authentication method, a palm print authentication method, a voice print authentication method, etc.

Further, the processing of confirming the authorized user performed in S312 to S315 may also be any one of the PIN input method, the password input method, the pattern input method, the face authentication method, the iris authentication method, the fingerprint authentication method, the palm print authentication method, the voice print authentication method, etc.

[Modification 2]

Even in the operation control processing of the non-designated application lock function according to the present example, processing in which no application is stored (registered) as the designated application is possible. In this case, the operator may instruct to start the non-designated application lock function control in a state in which the home screen 180b is displayed on the touch screen 180.

In this case, the respective processing of S301, S302, S305, S308, and S316 in FIG. 5 is not executed. In other words, the processing of S309 to S311 may be performed on the assumption that all the operation instructions input in the processing of S306 are operation instructions for other than the designated application. Thus, whether or not the activation instruction for all applications of the mobile information terminal 100 can be executed is controlled based on the result of the confirmation processing for the non-designated application activation permission code.

As described above, the mobile information terminal 100 according to the present example allows all operators to operate the predetermined application selected by the authorized user. In terms of other operations, however, the non-designated application lock function control appropriately permitted can be executed based on the result of the confirmation processing for the non-designated application activation permission code defined by the authorized user in advance. That is, it is possible to provide an easy-to-use mobile information terminal capable of appropriately limiting the terminal function according to the operator, and a control method thereof.

Example 3

Hereinafter, Example 3 will be described. A basic configuration of Example 3 is similar to that of Example 1. In the following, differences between the present example and Example 1 will be mainly described, and the description of common portions will be omitted as much as possible to avoid their duplication.

[Operation Control Example of Non-Designated Application Lock Function]

In the following, operation control processing of a non-designated application lock function will be described by taking, as an example, a case where an authorized user of the mobile information terminal 100 lends the mobile information terminal 100 to friends or the like in a state in which an image viewing application is selected and activated, in order to show the camera captured images recorded on the various information storage area 1019 of the storage unit 110 to the friends or the like.

Figure 6:
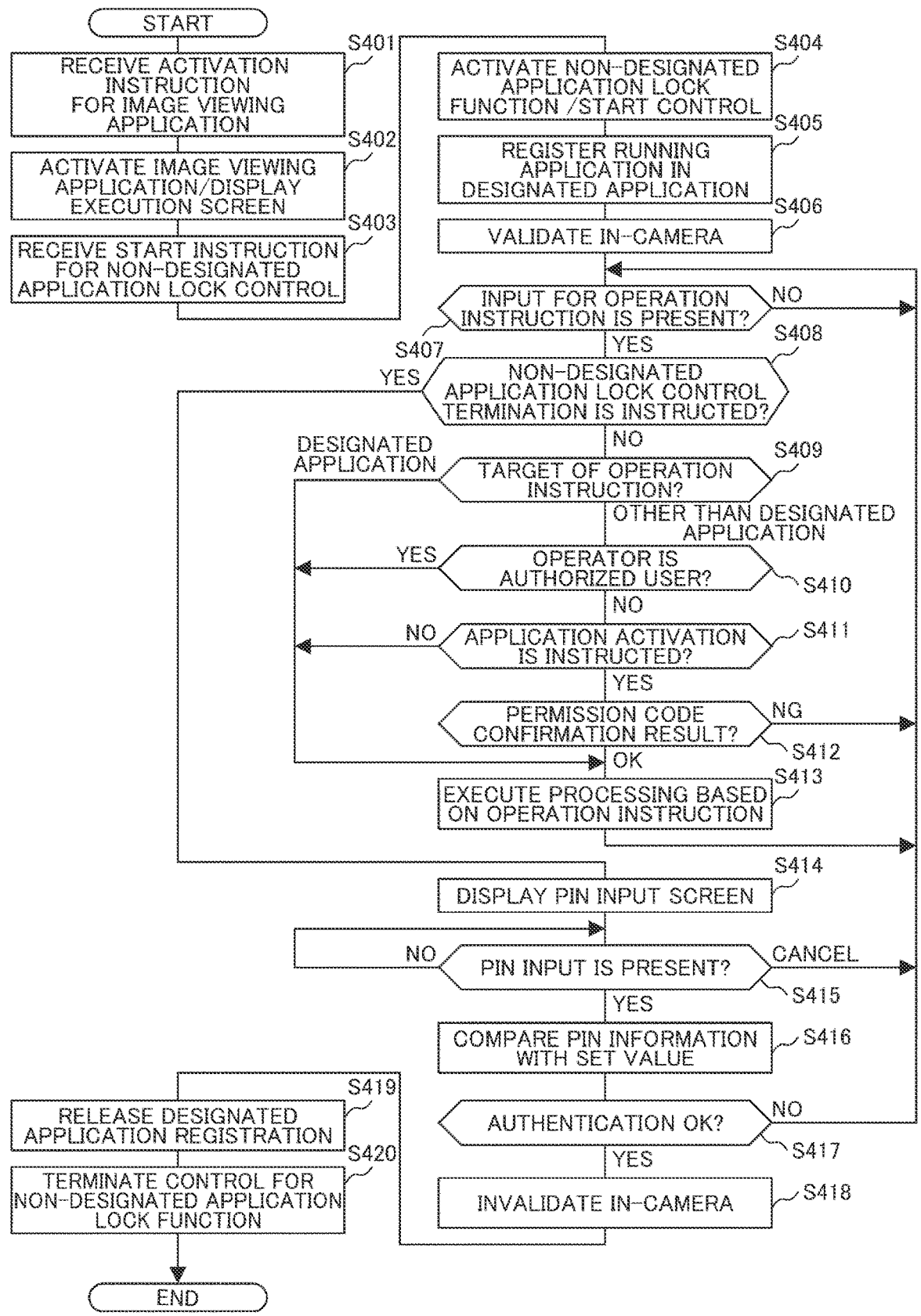
FIG. 6 is a flowchart of a non-designated application lock function of a mobile information terminal according to Example 3.

FIG. 6 is a flowchart of an example of the operation control processing of the non-designated application lock function. The processing of the flowchart shown in the same figure mainly relates to the non-designated application lock function controlled by the non-designated application lock function portion 1102A. Incidentally, the control of the non-designated application lock function portion 1102A may be performed independently of the control of the terminal lock function portion 1102T described above.

First, in the processing of S401 to S406, processing similar to S201 to S206 in the flowchart of FIG. 3A is performed. In other words, activation processing for an image viewing application and start processing for a non-designated application lock function control are performed according to an operation instruction from an operator. Further, processing of storing (registering) a running application (image viewing application in the present example) in a designated application and the validation of the in-camera 133, and start-up processing for the face authentication processing portion 1103F are performed according to an instruction from the operator.

Subsequently, the basic operation function unit 1101 confirms whether or not an operation instruction is input to the mobile information terminal 100 by an operator's touch operation on the touch screen 180. When it is confirmed that there is no operation instruction input to the touch screen 180 (S407: No), the basic operation function unit 1101 repeats the processing of S407. When it is confirmed that there is an operation instruction input to the touch screen 180 (S407: Yes), the basic operation function unit 1101 confirms whether or not the operation instruction is an instruction to terminate the non-designated application lock function control (S408). When the operation instruction input in the processing of S407 is confirmed to be an instruction to terminate the non-designated application lock function control (S408: Yes), the basic operation function unit 1101 proceeds to processing of S414. Further, when the operation instruction input in the processing of S407 is confirmed not to be an instruction to terminate the non-designated application lock function control (S408: No), the basic operation function unit 1101 proceeds to processing of S409.

In the processing of S409, the non-designated application lock function portion 1102A confirms whether the operation instruction input in the processing of S407 is an operation instruction targeted for the application (the image viewing application in the present example) stored as the designated application in the processing of S405 or an operation instruction targeted for other than the designated application (S409). When the operation instruction input in the processing of S407 is confirmed to be the operation instruction targeted for the designated application (S409: designated application), the non-designated application lock function portion 1102A returns to the processing of S407 after the image viewing application function portion executes each processing based on the operation instruction (S413). When the operation instruction input in the processing of S407 is confirmed to be the operation instruction targeted for other than the designated application (S409: other than the designated application), the non-designated application lock function portion 1102A further confirms whether the operator is the authorized user of the mobile information terminal 100 (S410).

In the processing of S410, when the operator is confirmed to be the authorized user of the mobile information terminal 100 (S410: Yes), the non-designated application lock function portion 1102A returns to the processing of S407 after each application function portion of the other operation function unit 1109 executes each processing based on the operation instruction input in the processing of S407 (S413). Further, when the operator is not confirmed to be the authorized user of the mobile information terminal 100 (S410: No), the non-designated application lock function portion 1102A confirms whether or not the operation instruction input in the processing of S407 is an instruction to activate any application other than the designated application (S411).

In the processing of S411, when the operation instruction input in the processing of S407 is confirmed to be the instruction to activate any application other than the designated application (S411: Yes), the non-designated application lock function portion 1102A performs processing of confirming a non-designated application activation permission code (S412). When the input of the non-designated application activation permission code is confirmed in the processing of S412 (S412: OK), the non-designated application lock function portion 1102A executes processing based on the operation instruction, i.e., activation of any application other than the designated application (S413). On the other hand, when the input of the non-designated application activation permission code is not confirmed in the processing of S412 (S412: NG), the non-designated application lock function portion 1102A returns to the processing of S407 without executing the processing based on the operation instruction, i.e., the activation of any application other than the designated application. The processing of confirming the non-designated application activation permission code in S412 may be processing similar to S212 to S215 in the flowchart of FIG. 3A.

In the processing of S411, when the operation instruction input in the processing of S407 is confirmed not to be the instruction to activate any application other than the designated application (S411: No), the non-designated application lock function portion 1102A returns to the processing of S407 after executing each processing based on the operation instruction (S413). That is, any application other than the designated application that has already been activated performs the confirmation processing of the non-designated application activation permission code in the processing of S412 at the time of activation, and is therefore judged to have been activated after obtaining the permission of the authorized user of the mobile information terminal 100. In addition, any application other than the designated application activated through the confirmation processing of the non-designated application activation permission code may be allowed in terms of operation for all operators without new authentication processing until the operation of the application is completed.

In the processing of S414 to S420, processing similar to S212 to S218 in the flowchart of FIG. 3A may be performed.

The operation control processing of the non-designated application lock function according to the present example is a combination of the operation control processing of the non-designated application lock function according to Example 1 and the operation control processing of the non-designated application lock function according to Example 2.

As described above, the mobile information terminal 100 according to the present example allows all operators to operate the predetermined application selected by the authorized user. However, in regard to other operations, except for the case where the authorized user is the operator, the non-designated application lock function control can be executed which is appropriately restricted or appropriately allowed based on the result of the confirmation processing of the non-designated application activation permission code defined by the authorized user in advance. That is, it is possible to provide an easy-to-use mobile information terminal capable of appropriately limiting the terminal function according to the operator, and a control method thereof.

Example 4

Hereinafter, Example 4 will be described. Incidentally, a basic configuration of Example 4 is similar to that of Example 1. Hereinafter, differences between the present example and Example 1 will be mainly described, and the description of common portions will be omitted as much as possible to avoid their duplication.

[Operation Control Example of Non-Designated Application Lock Function]

In Example 1, all operation instructions in the application stored (registered) as the designated application are allowed for all operators (that is, even when the operator is not the authorized user of the mobile information terminal 100). However, even in the case of an operation instruction in an application stored (registered) as a designated application, there is also an operation instruction not desired to be allowed when the operator is not the authorized user of the mobile information terminal 100. For example, in the case of the above-described image viewing application, even if the operation instruction is within the image viewing application, an instruction to delete image data, an instruction to move the image data between folders, etc. are not allowed where the operator is not the authorized user of the mobile information terminal 100.

Figure 7:
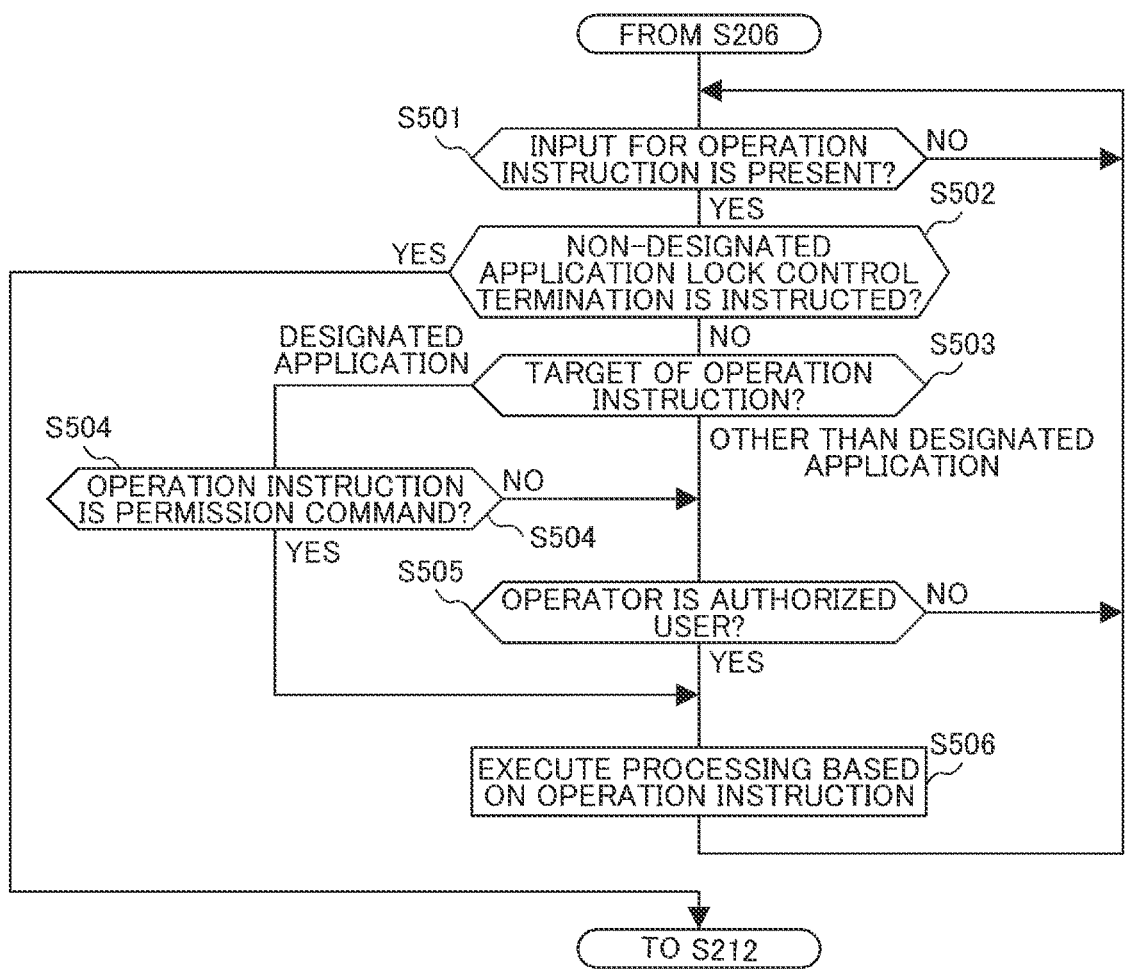
FIG. 7 is a flowchart of a non-designated application lock function of a mobile information terminal according to Example 4.

In this case, in the flowchart shown in FIG. 3A, the operation control processing of the non-designated application lock function in which the processing of S207 to S211 is replaced with processing of S501 to S506 in FIG. 7 may be performed. In the following, the operation control processing of the non-designated application lock function according to the present example will be described by taking, as an example, a case where the authorized user of the mobile information terminal 100 lends the mobile information terminal 100 to friends or the like in a state in which the image viewing application is selected and activated, in order to show the camera captured images recorded on the various information storage area 1019 of the storage unit 110 to the friends or the like.

FIG. 7 is a part of a flowchart of an example of the operation control processing of the non-designated application lock function. Processing similar to S201 to S206 in the flowchart shown in FIG. 3A is performed before the processing shown in the same figure. Further, processing similar to S212 to S218 in the flowchart shown in FIG. 3A is performed after the processing shown in the same figure, but the description thereof is omitted.

When the processing similar to S201 to S206 in the flowchart of FIG. 3A is executed, the basic operation function unit 1101 subsequently confirms whether or not an operation instruction is input to the mobile information terminal 100 by an operator's touch operation on the touch screen 180. When it is confirmed that there is no operation instruction input to the touch screen 180 (S501: No), the processing of S501 is repeated. When it is confirmed that the operation instruction input to the touch screen 180 is present (S501: Yes), the basic operation function unit 1101 confirms whether or not the operation instruction is an instruction to terminate the non-designated application lock function control (S502). When it is confirmed that the operation instruction input in the processing of S502 is the instruction to terminate the non-designated application lock function control (S502: Yes), the basic operation function unit 1101 performs processing similar to S212 to S218 in the flowchart of FIG. 3A subsequently. Further, when the operation instruction input in the processing of S501 is confirmed not to be the instruction to terminate the non-designated application lock function control (S502: No), the basic operation function unit 1101 proceeds to the processing of S503.

In the processing of S503, the non-designated application lock function portion 1102A confirms whether the operation instruction input in the processing of S501 is an operation instruction targeted for the application (the image viewing application in the present example) stored as the designated application in the processing of S205 or an operation instruction targeted for other than the designated application (S503). When the operation instruction input in the processing of S501 is confirmed to be the operation instruction targeted for the designated application (S503: designated application), the non-designated application lock function portion 1102A further confirms whether or not the operation instruction input in the processing of S501 is a permission command (S504). The permission command will be described later. When the operation instruction input in the processing of S501 is confirmed to be the permission command targeted for the designated application (S504: Yes), the non-designated application lock function portion 1102A returns to the processing of S501 after the image viewing application function portion executes each processing based on the operation instruction (S506).

When the operation instruction input in the processing of S501 is confirmed not to be the permission command targeted for the designated application (S504: No), or when the operation instruction input in the processing of S501 is confirmed to be the operation instruction targeted for other than the designated application (S503: other than the designated application), the non-designated application lock function portion 1102A confirms whether or not the operator is the authorized user of the mobile information terminal 100 (S505).

When the operator is confirmed to be the authorized user of the mobile information terminal 100 in the processing of S505 (S505: Yes), the non-designated application lock function portion 1102A returns to the processing of S501 after the image viewing application function portion or other respective application function portions execute each processing based on the operation instruction input in the processing of S501 (S506). Further, when the operation is not confirmed to be the authorized user of the mobile information terminal 100 (S505: No), the non-designated application lock function portion 1102A returns to the processing of S501 without executing the operation instruction input in the processing of S501.

Here, in the example of the image viewing application described above, the permission command is a command group whose execution may be allowed even in the case where the operator is not the authorized user of the mobile information terminal 100, except for the instruction to delete the image data, the instruction to move the image data between the folders, etc. The permission command may be managed in a permission command table for each application installed in the mobile information terminal 100. The permission command table may be set in advance by the authorized user of the mobile information terminal 100 and stored in the various information storage area 1019 of the storage unit 110. Each application installed in the mobile information terminal 100 may be automatically generated according to the security level of each command.

In the processing of S504, on the basis of the name of the application stored as the designated application in the processing of S205, the non-designated application lock function portion 1102A may read the corresponding permission command table from the various information storage area 1019, and further judge whether or not the operation instruction input in the processing of S501 is an operation instruction described in the permission command table.

Through the above processing, the operation instructions in the application stored (registered) as the designated application, and the operation instructions described in the permission command table are allowed for all operators. Even in the case of the operation instructions in the application stored (registered) as the designated application, the operation instruction being not described in the permission command table and the operation instructions for the application being not stored (registered) as the designated application are allowed only when the operator is the authorized user of the mobile information terminal 100. That is, it is possible to provide an easy-to-use mobile information terminal capable of appropriately limiting the terminal function according to the operator, and a control method thereof.

Even in the flowcharts shown in FIG. 3D and FIG. 6, the control according to whether or not the operation instruction input to the mobile information terminal 100 by the operator's touch operation on the touch screen 180 is a permission command may be applied as with the above.

As mentioned above, although the examples of the example have been described using Examples 1 to 4, it goes without saying that the configuration for realizing the technique of the present example is not limited to the above-described examples, and various modifications can be considered. Some or all of the above-described configurations may be realized by hardware, for example, by designing with an integrated circuit, or the like. Alternatively, the microprocessor unit or the like may be realized by software by interpreting and executing a program which realizes each function or the like. Hardware and software may be used in combination. The software may be placed in a state of being stored in advance in the ROM 103 or the storage unit 110 of the mobile information terminal 100, etc. at the time of product shipment. It may be obtained from various server devices or the like on the Internet after the product shipment. Further, the software provided by a memory card, an optical disk or the like may be acquired.

REFERENCE SIGNS LIST

100 . . . mobile information terminal, 101 . . . main control unit, 102 . . . system bus, 103 . . . ROM, 104 . . . RAM, 110 . . . storage unit, 120 . . . operation input unit, 121 . . . operation key, 122 . . . touch sensor, 123 . . . touch panel, 130 . . . image processing section, 131 . . . display unit, 132 . . . image signal processing unit, 133 . . . first image input unit, 134 . . . second image input unit, 140 . . . audio processing section, 150 . . . sensor section, 160 . . . communication section, 170 . . . extension interface unit, 180 . . . touch screen, 1101 . . . basic operation function unit, 1102 . . . lock control function unit, 1102T . . . terminal lock function portion, 1102A . . . non-designated application lock function portion, 1103 . . . user authentication function unit, 1103P . . . PIN input processing portion, 1103F . . . face authentication processing portion, 1103H . . . fingerprint authentication processing portion.

The invention claimed is:

1. A mobile information terminal having a lock state in which the mobile information terminal requires a user authentication process to transition to an unlock state, the mobile information terminal comprising:
an operating interface, in the unlock state, configured to receive:
a first operation to designate any of applications including a first application and a second application that is different from the first application;
a second operation to impose restrictions on execution of any of the applications; and
a third operation to remove the restrictions on the execution of the any of the applications;
a controller configured to:
perform a first user authentication process to authenticate the user in the lock state;
after the user is authenticated at the first user authentication process,
(1) execute the first application in the unlock state in response to the operating interface receiving the first operation to designate the first application, and
(2) restrict the execution of the second application in the unlock state, in response to the operating interface receiving (i) the first operation not to designate the second application but to designate the first application and (ii) the second operation to impose the restrictions on the execution of the second application;
perform a second user authentication process to authenticate the user without transition to the lock state from the unlock state, in response to the operating interface receiving, in the unlock state, the third operation to remove the restrictions on the execution of the second application; and
after the user is authenticated at the second user authentication process, execute the second application in the unlock state.

2. The mobile information terminal according to claim 1, wherein the first user authentication process is performed based on PIN authentication, password authentication, pattern authentication, face authentication, iris authentication, fingerprint authentication, or voiceprint authentication.

3. The mobile information terminal according to claim 1, wherein the controller is further configured to control the first user authentication process by biometric authentication while controlling restriction of execution of the other applications.

4. The mobile information terminal according to claim 3, wherein the biometric authentication is performed each time the operating interface accepts the first operation and the second operation.

5. The mobile information terminal according to claim 3, wherein the biometric authentication is always performed while the execution of the other applications is restricted.

6. The mobile information terminal according to claim 3, wherein the biometric authentication is performed at predetermined time intervals.

7. The mobile information terminal according to claim 1, wherein the operating interface is a touch panel, and
wherein the operating interface is configured to recognize the third operation when the touch panel detects that the user's multiple fingers touch the touch panel simultaneously.

8. A method for controlling a mobile information terminal having a lock state in which the mobile information terminal requires a user authentication process to transition to an unlock state, the method comprising:
in the unlock state, receiving one of:
a first operation to designate any of applications including a first application and a second application that is different from the first application;
a second operation to impose restrictions on execution of any of the applications; and
a third operation to remove the restrictions on the execution of the any of the applications;
performing a first user authentication process for authenticating the user in the lock state;
after the user is authenticated in the first user authentication process,
(1) executing the first application in the unlock state in response to receiving the first operation to designate the first application; and
(2) restricting the execution of the second application in the unlock state, in response to receiving (i) the first operation not to designate the second application but to designate the first application and (ii) the second operation to impose the restrictions on the execution of the second application;
performing a second user authentication process for authenticating the user without transition to the lock state from the unlock state, in response to receiving, in the unlock state, the third operation to remove the restrictions on the execution of the second application; and
after the user is authenticated at the second user authentication process, executing the second application in the unlock state.

9. The method according to claim 8, wherein the first user authentication process for authenticating the user includes executing PIN authentication, password authentication, pattern authentication, face authentication, iris authentication, fingerprint authentication, or voiceprint authentication.

10. The method according to claim 8, wherein the first user authentication process for authenticating the user is performed based on biometric authentication while restricting execution of the other applications.

11. The method according to claim 10, wherein the biometric authentication is performed each time the first operation and the second operation are accepted.

12. The method according to claim 10, wherein the biometric authentication is always performed while the execution of the other applications is restricted.

13. The method according to claim 10, wherein the biometric authentication is performed at predetermined time intervals.

14. The method according to claim 8,
 wherein the mobile information terminal includes a touch panel, and
 wherein the method further comprises recognizing the third operation when the touch panel detects that the user's multiple fingers touch the touch panel simultaneously.

* * * * *